United States Patent
Martin

(10) Patent No.: US 10,776,769 B2
(45) Date of Patent: Sep. 15, 2020

(54) UNIFIED PAYMENT VEHICLE

(71) Applicant: HRB Innovations, Inc., Las Vegas, NV (US)

(72) Inventor: Daniel D. Martin, Kansas City, MO (US)

(73) Assignee: HRB Innovations, Inc., Las Vegas, NV (US)

(*) Notice: Subject to any disclaimer, the term of this patent is extended or adjusted under 35 U.S.C. 154(b) by 378 days.

(21) Appl. No.: 14/697,043

(22) Filed: Apr. 27, 2015

(65) Prior Publication Data

US 2016/0314451 A1 Oct. 27, 2016

(51) Int. Cl.
*G06Q 20/22* (2012.01)
*G06Q 20/40* (2012.01)

(52) U.S. Cl.
CPC ......... *G06Q 20/227* (2013.01); *G06Q 20/405* (2013.01)

(58) Field of Classification Search
None
See application file for complete search history.

(56) References Cited

U.S. PATENT DOCUMENTS

| | | | | |
|---|---|---|---|---|
| 7,401,731 B1* | 7/2008 | Pletz | ...................... | G06Q 20/24 235/375 |
| 7,502,760 B1* | 3/2009 | Gupta | .................. | G06Q 20/367 705/64 |
| 8,380,177 B2* | 2/2013 | Laracey | ............. | G06Q 30/0253 455/414.1 |
| 8,622,309 B1* | 1/2014 | Mullen | ................. | G07F 7/0853 235/492 |
| 2004/0039694 A1* | 2/2004 | Dunn | ..................... | G06Q 40/02 705/39 |
| 2007/0088641 A1* | 4/2007 | Aaron | .................... | G06Q 40/02 705/35 |
| 2008/0301041 A1* | 12/2008 | Bruk | .................... | G06Q 20/227 705/39 |
| 2009/0157519 A1* | 6/2009 | Bishop | ................ | G06Q 20/207 705/19 |
| 2011/0320294 A1* | 12/2011 | Votaw | ................. | G06Q 20/227 705/17 |
| 2012/0123933 A1* | 5/2012 | Abel | .................... | G06Q 20/105 705/39 |

(Continued)

OTHER PUBLICATIONS

"Looking out for you." Discover Bank. Date Printed: Jul. 15, 2015; Date Posted: Unknown; <https://www.discover.com/credit-cards/member-benefits/security/>.

(Continued)

*Primary Examiner* — Christopher Bridges
(74) *Attorney, Agent, or Firm* — Erise IP, P.A.

(57) ABSTRACT

A system, method, and computer-readable media for automatically allocating a payment among a plurality of funding accounts according to rules configured by the user. Embodiments of the invention can further allocate a single purchase among multiple payment accounts. This can be used, for example, to automatically aggregate credit limits where no single funding account has sufficient credit to fund the purchase alone. Embodiments of the invention can also assist the user with budgeting expenses by charging payments to one or more budgeting accounts previously defined by the user according to additional rules.

16 Claims, 13 Drawing Sheets

(56) References Cited

U.S. PATENT DOCUMENTS

| | | | |
|---|---|---|---|
| 2012/0197691 A1* | 8/2012 | Grigg | G06Q 20/363 |
| | | | 705/14.1 |
| 2013/0024371 A1* | 1/2013 | Hariramani | G06Q 20/36 |
| | | | 705/41 |
| 2013/0036047 A1* | 2/2013 | Busher | G06Q 40/10 |
| | | | 705/41 |
| 2013/0159080 A1* | 6/2013 | Wu | G06O 20/3276 |
| | | | 705/14.23 |
| 2013/0166332 A1* | 6/2013 | Hammad | G06Q 20/32 |
| | | | 705/5 |
| 2013/0226798 A1* | 8/2013 | Orttung | G06Q 20/027 |
| | | | 705/44 |
| 2013/0254049 A1* | 9/2013 | Todd | G06Q 20/202 |
| | | | 705/18 |
| 2013/0262291 A1* | 10/2013 | Ricci | G06Q 30/04 |
| | | | 705/38 |
| 2014/0136353 A1* | 5/2014 | Goldman | G06Q 20/405 |
| | | | 705/21 |
| 2014/0278892 A1* | 9/2014 | Collart | G06Q 20/36 |
| | | | 705/14.27 |
| 2015/0142663 A1* | 5/2015 | Lawson | G06Q 20/10 |
| | | | 705/44 |

OTHER PUBLICATIONS

"Learn about freezing your Discover Account." Discover Bank. Date Printed: Jul. 15, 2015; Date Posted: Unknown; <https://www.discover.com/credit-cards/help-center/faqs/freeze-account.html>.

\* cited by examiner

UNIFIED PAYMENT VEHICLE

RELATED APPLICATIONS

This non-provisional patent application shares certain common subject matter with U.S. patent application Ser. No. 14/697,101, filed Apr. 27, 2015, and entitled "PAYMENT VEHICLE FOR BUDGETING," and with U.S. patent application Ser. No. 14/697,233, filed Apr. 27, 2015 and entitled "PAYMENT VEHICLE WITH PERSONALIZED REWARDS PROGRAM." The identified applications are hereby incorporated by reference in their entirety into the present application.

BACKGROUND

1. Field

Embodiments of the invention generally relate to payment systems and, more particularly, to a unified payment vehicle capable of automatically allocating a payment among a collection of accounts according to rules configured by the user.

2. Related Art

Traditionally, consumers carry multiple means of payment, including credit cards, debit cards, prepaid cards, and checks, for a variety of reasons. For example, one payment vehicle may offer higher rewards than another or may have a higher credit limit. Furthermore, certain merchants may only accept certain types of card or offer a discount for using those types. However, carrying multiple payment vehicles and remembering which to use in which circumstances is inconvenient and burdensome for the user. Accordingly, there is a need for a unified payment vehicle that can automatically present the most appropriate mode of payment for the current transaction.

SUMMARY

Embodiments of the invention address this need by providing a unified payment vehicle that automatically allocates a payment among available funding accounts according to rules configured by the user. In a first embodiment, the invention includes a payment processing system comprising a first payment vehicle for making a first payment at a first merchant, wherein a plurality of funding accounts are associated with the payment vehicle, a funding account selector for receiving transaction information from the first merchant, allocating the first payment among the plurality of funding accounts, and approving the first payment; and a rules data store storing one or more rules for automatically determining how payments are allocated among the plurality of funding accounts.

In a second embodiment, the invention includes a method of processing a payment, comprising the steps of receiving, from a merchant, information for a transaction associated with a user and including a payment amount, retrieving, from a rules data store, one or more rules associated with the user, determining, for a plurality of funding accounts associated with the user, whether an allocation of the payment among the plurality of funding accounts consistent with the one or more rules exists, if the allocation exists, approving the transaction and allocating the payment amount among the plurality of funding accounts according to the allocation, and if the allocation does not exist, rejecting the transaction.

In a third embodiment, the invention includes one or more computer-readable media storing computer-executable instructions which, when executed by a processor, provide an interface engine operable to provide, to a user, a funding account interface allowing the user to input a plurality of funding accounts, provide, to the user, a rewards program interface allowing the user to input rewards program information for at least some of the plurality of funding accounts, and provide, to the user, a rules interface allowing the user to input a rule specifying how a payment is allocated among the plurality of funding accounts.

This summary is provided to introduce a selection of concepts in a simplified form that is further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 12:
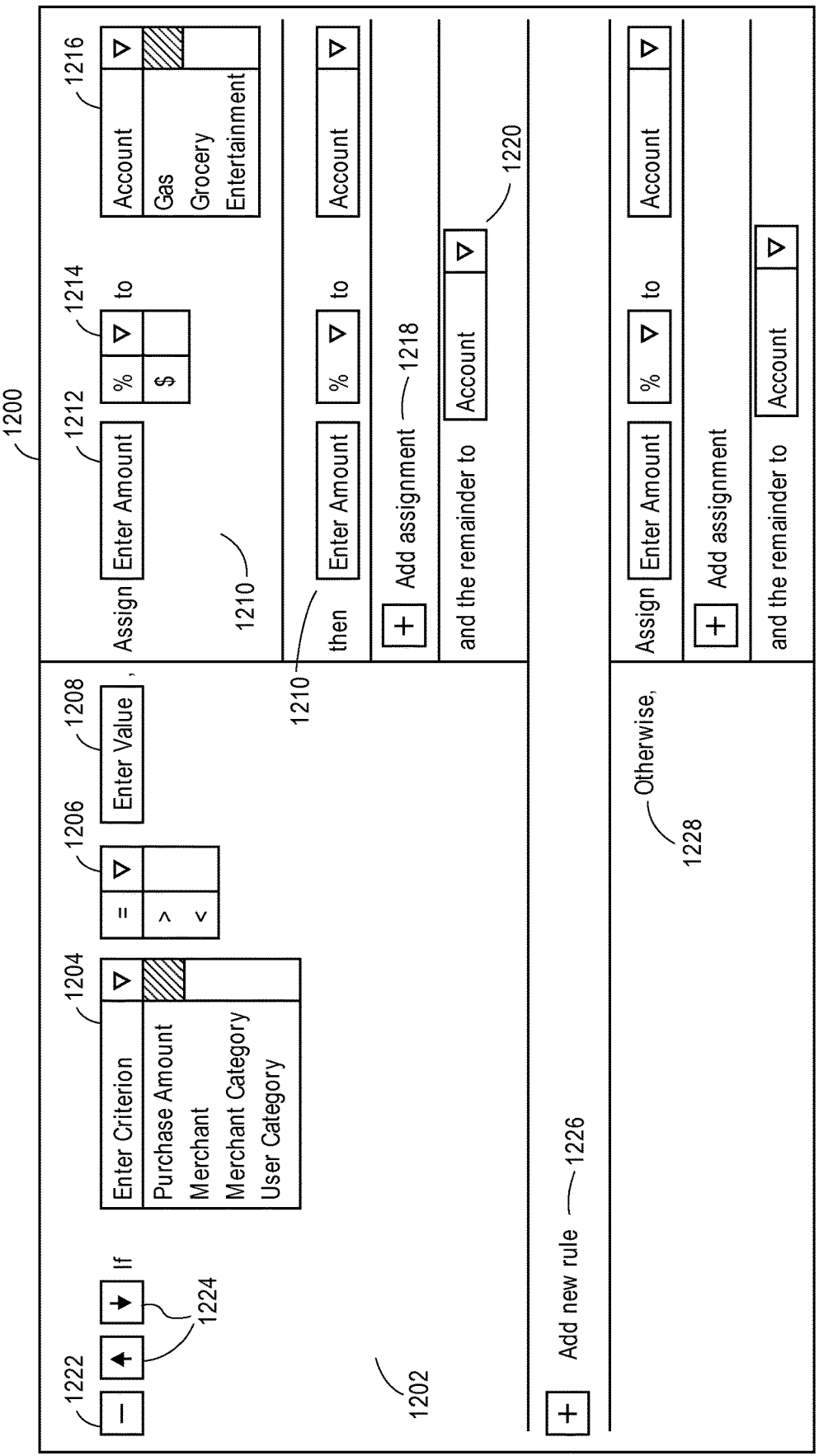
Figure 13:
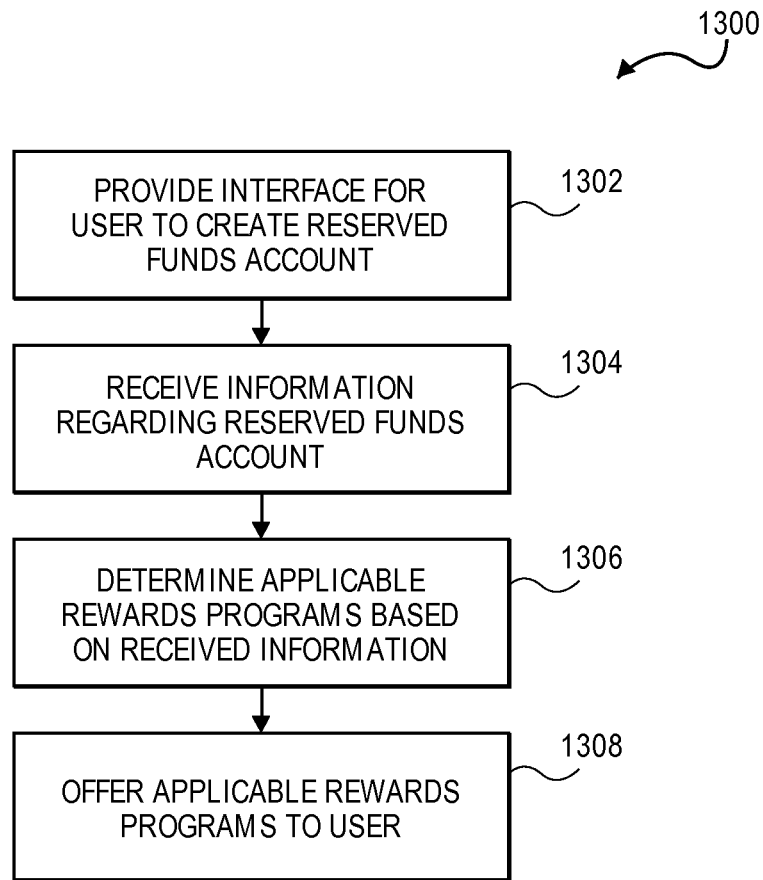
Figure 14:
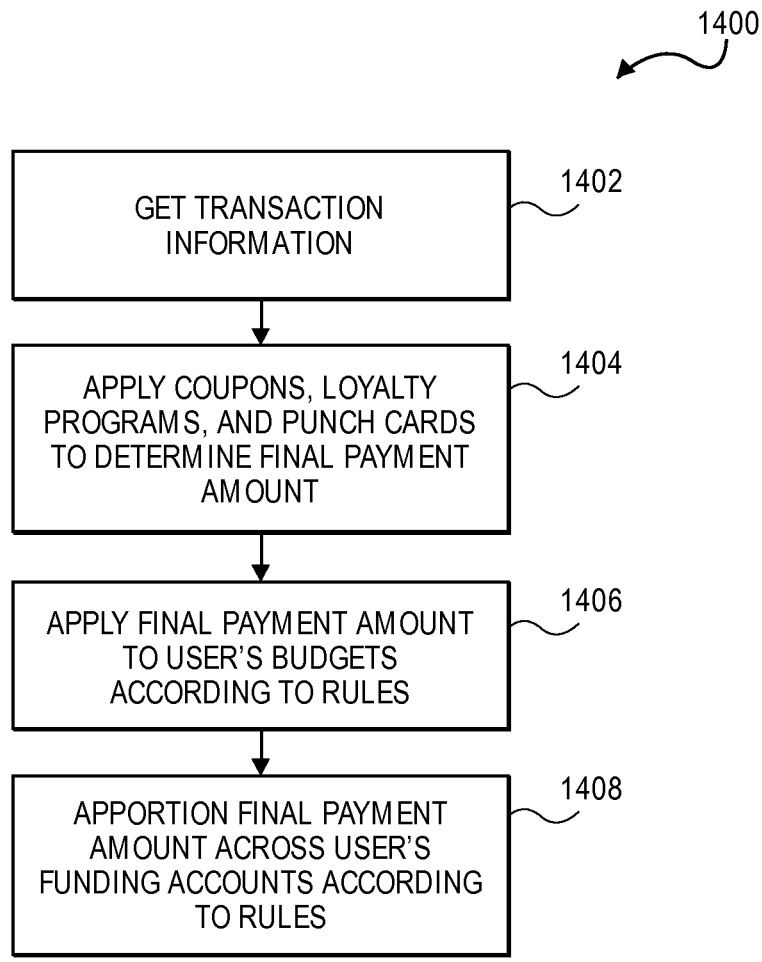

FIG. 12 depicts an interface for configuring rules to automatically assign payments to virtual budgeting accounts; and FIG. 13 depicts a flowchart illustrating the operation of a method of assigning a customized rewards program to a user in accordance with certain embodiments of the invention; and FIG. 14 depicts a high-level flowchart showing the flow of a transaction according to yet another embodiment of the present invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

I. System Overview

At a high level, embodiments of the invention integrating all of the features described in greater detail below perform a transaction as follows. First, the merchant with whom the transaction will take place is identified, and any rewards programs available, whether specific to the merchant or due to rewards programs linked to the payment vehicle are identified. Next, any relevant products for loyalty programs (including frequent shopper programs and punch-card style programs) are identified for the user. Then the subject matter for the transaction (i.e., the goods or services being purchased) is determined and any relevant discounts from whatever source are identified, and any relevant coupons (whether vendor coupons, manufacturer coupons, or coupons from another source) or punch cards presented to the merchant for redemption. Once this is done, the total amount of the transaction can be determined, and it can be determined whether the transaction falls within the user's budget (based on the merchant, the purchase amount and other factors). If it does, or if the user performs a budget override, the payment amount can be allocated among the various funding accounts with which the user has configured the payment vehicle according to the rules configured by the user.

Certain embodiments of the invention include a single payment vehicle combining all of the user's financial accounts, with further provision made for integrating the user's loyalty programs. In this way, the user is freed from the necessity of carrying a wallet full of cards for various financial accounts, frequent shopper programs, punch cards, and the like. The payment vehicle can further automatically allocate payments across the user's financial accounts according to the user's previously expressed preferences, further maximizing ease-of-use.

In some embodiments, in addition to allocating a purchase to one or more funding accounts, the invention can allocate the purchase across one or more budgeting accounts. For example, the user may budget an entertainment account containing a certain amount of funds and configure rules determining which purchases are charged against that account. Once the budgeted funds are exhausted, further charges against the entertainment account may be rejected unless the user overrides the budget for that charge.

In further embodiments, this integration of the user's finances in a single place can be used to provide the user with savings and rewards programs customized to their needs. For example, a user can reserve a portion of their monthly budget towards saving up for a large purchase or other expenditure. Rewards programs can be offered to the user to encourage their meeting this goal, or based on the goal itself. For example, a user saving for a vacation could be offered airline mileage rewards program to use to defray the cost of the trip, with bonus miles awarded for contributions to the savings, redeemable once the saving goal has been met.

II. Operational Environment for Embodiments of the Invention

Figure 1:
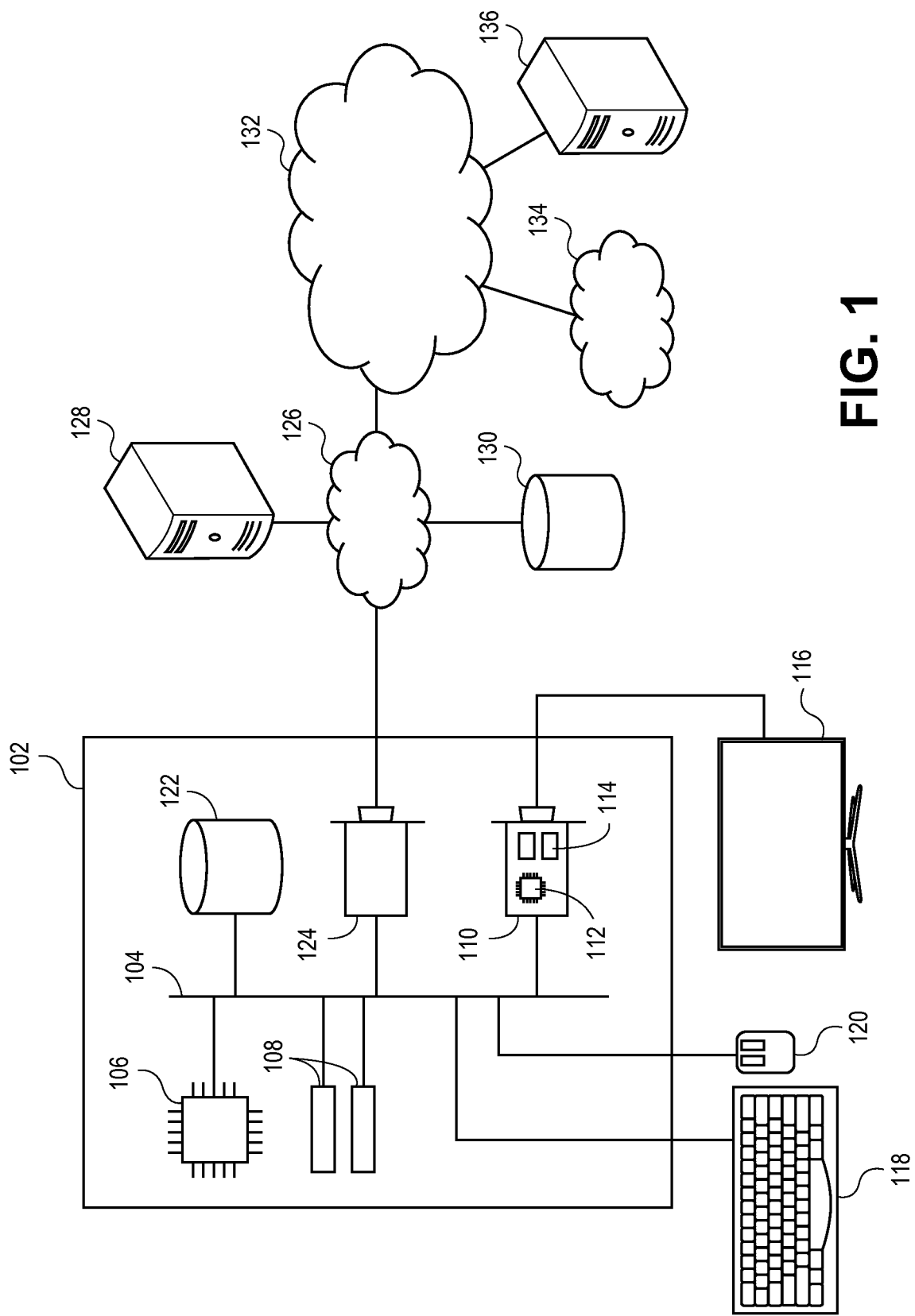
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

III. Unified Payment Vehicle

Broadly, certain embodiments of the invention provide a unified payment vehicle capable of automatically allocating a payment made by the user among a number of financial accounts according to rules configured by the user. For example, the user may configure a rule to allocate payments first to the funding account that provides the most rewards for a given purchase. Embodiments of the invention can further allocate a single purchase among multiple payment accounts. This can be used, for example, to automatically aggregate credit limits where no single funding account has sufficient credit to fund the purchase alone. In this way, the user is spared the need to keep track of the available credit remaining for each account.

A. Elements of the System

Figure 2:
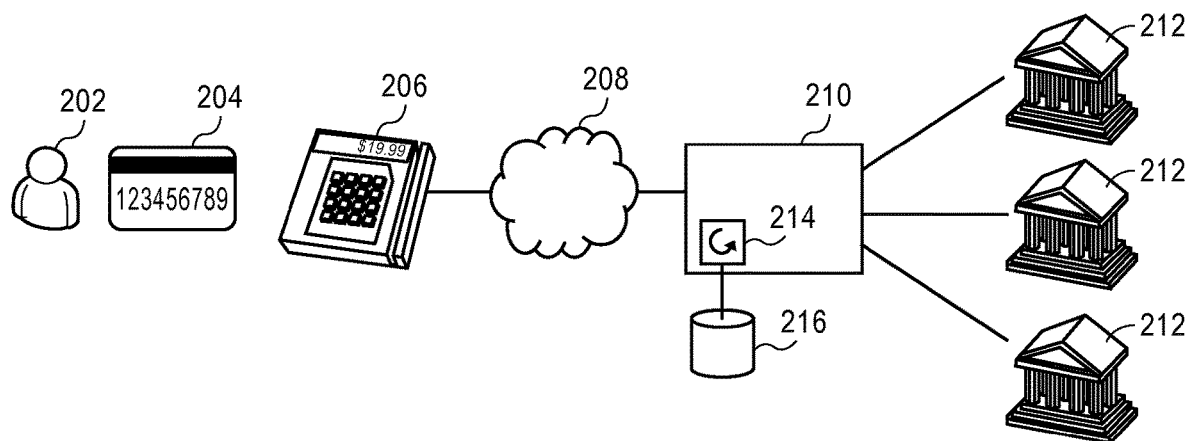
FIG. 2 depicts a first system in accordance with embodiments of the invention.

Turning now to FIG. 2, a first system in accordance with embodiments of the invention is depicted. When making a purchase, user 202 presents payment vehicle 204 to merchant 206. In some embodiments, payment vehicle is a conventional credit card with an account number encoded on the magnetic stripe. In other embodiments, payment vehicle 204 is a chip-and-PIN card containing an embedded microcontroller and memory. In still other embodiments, payment vehicle is a smartphone equipped with an application for Near-Field Communication (NFC) payments, Quick-Response (QR) Code payments, or other mobile payments. In yet other embodiments, payment vehicle 204 is a contactless payment device such as an RFID key fob or an analog payment vehicle such as a handwritten check. Payment vehicle 204 can also be any representation of a peer-to-peer currency store, such as a Bitcoin wallet.

In some embodiments, the user may have multiple payment vehicles 204 for the same account. For example, a married couple may each have their own payment vehicle 204 that is linked to the same set of underlying funding accounts and funding rules. In some such embodiments, the user may have the option of multiple types of funding vehicle to present, each of which ties to the same set of underlying funding accounts and funding rules. Thus the user might pay with a credit card or a check, but the payment would be allocated among the funding accounts the same regardless of which they choose.

In some embodiments, merchant 206 accepts payment vehicle 204 using a point-of-sale (POS) terminal specially designed to operate with the system; in other embodiments, merchant 206 accepts payment vehicle using conventional POS equipment as it would with any other payment vehicle of the corresponding type (credit card, debit card, etc.).

When presented with payment vehicle 204, merchant 206 submits, via network 208, transaction information to payment clearinghouse 210. In some embodiments, this transaction information includes an account number, a payment amount, and a merchant identifier. Additional or equivalent information may also be included. For example, instead of including the user's account number, a single-use security code can be transmitted that identifies the user's account but cannot be used to make subsequent purchases. Similarly, instead of a merchant identifier, an account number (which may or may not be linkable to the merchant) into which the payment should be deposited can be provided.

Additional information characterizing the purchase may also be included in the transaction information. For example, a merchant category such as "entertainment," "grocery," "gas," "restaurant," etc. can be included. In some embodiments, this information is identified with the merchant and is the same for every purchase from that merchant. In other embodiments, the merchant category is determined for the individual purchase based on the preponderant component of the purchase. Thus, if a user purchases a cup of coffee and a tank of gas at a gas station, the merchant category would be provided as "gas," but if the customer instead purchased only lottery tickets at that same gas station, the merchant category would be provided as "entertainment." In still other embodiments, the category may be broken down by amount; thus, in the above example, the transaction information could include separate amounts and categories for the coffee and the gas. In yet other embodiments, the merchant category can be provided by (or overridden by) the user at the time of purchase.

It is the function of payment clearing house 210 to determine whether the transaction is to be authorized. In conventional payment systems, this role is performed by, for example, a credit card interchange for credit card transactions or an automated clearing house (ACH) for debit transactions. The clearing house 210 receives the request, queries the issuing financial institution 212 to determine funds availability, and approves or declines the transaction.

In the embodiment depicted in FIG. 2, funding account selector 214 is located in the clearing house. In other embodiments, funding account selector 214 may be located at financial institution 212 or integrated into payment vehicle 204. As discussed in greater detail below with respect to FIG. 4, it is the purposed of funding account selector 214 to determine, based on the rules stored in rules data store 216 and the transaction information received from the merchant, how to allocate the payment for the transaction across the available funding accounts. As the funding accounts may be distributed among the financial institutions 212, the process of allocating the payment may involve multiple queries to confirm that all balances of the funding accounts for a proposed allocation are sufficient. Allocating payment among funding accounts is discussed in greater detail below with respect to FIG. 5.

Once the allocation is determined, the payment can be divided according to the allocation, and the merchant can be notified that the transaction is approved. Alternatively, if no allocation consistent with the rules was found, the merchant can be notified that the transaction is rejected. In this way, funding account selector 214 is an intermediary between the merchant and the payment clearing house to automatically select the best source (or sources) of payment for the transaction.

Figure 3:
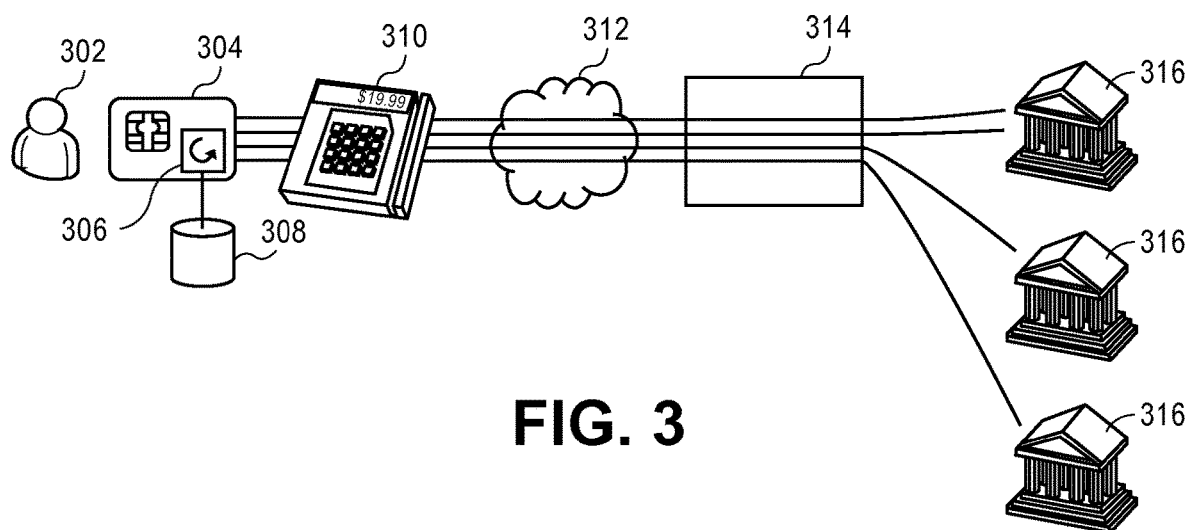
FIG. 3 depicts a second system in accordance with embodiments of the invention.

Turning now to FIG. 3, a second system in accordance with embodiments of the invention is depicted. The system depicted in FIG. 3 may operate instead of or in parallel with the system depicted in FIG. 2. Where user 202 has a simple payment vehicle 204, e.g., a magnetic-stripe card, user 302 has a more capable chip-and-PIN payment vehicle 304, which integrates funding account selector 306 and user-specific rules data store 308. In this embodiment, payment vehicle 304 receives the transaction information from merchant 310. Here, because funding account selector 306 is incorporated into the payment vehicle itself, the payment can be allocated among the funding accounts on the payment vehicle itself. In this way, the payment vehicle can provide the appropriate account information corresponding to the payment allocation at merchant point-of-sale 310. If the payment is allocated to only a single funding account, then payment vehicle 304 may interact with merchant point-of-sale 310 as a normal chip-and-PIN card. If, on the other hand, the payment is to be allocated across multiple funding accounts, then payment vehicle may instead generate multiple transactions, each corresponding to a different portion of the payment and a different funding vehicle. Each of these transactions can then be processed by merchant point-of-sale 310 in the usual way, being transmitted via network 312 to payment clearinghouse 314 and from there on to financial institution 316 corresponding to the funding account.

As discussed above, other variations on payment vehicle 304 are possible. For example, a mobile payment app on a smartphone could similarly include a user-specific rules data store 308 and funding account selector 306. In such an embodiment, the payment allocation could be presented to user 302 prior for confirmation prior to being transmitted to merchant point-of-sale 310. Similarly, if the funding account selector rejects the transaction because it cannot be allocated among the budgeting accounts, the user may be presented with the option to override the budgeting rejection or reallocate funds among the budgeting accounts. Alternatively, where payment vehicle 304 takes the form of a check, the allocation of the payment across funding accounts may not take place until the check is presented to the paying bank for payment. In still other embodiments, rules data store 308 may be located in the cloud and accessed by one or more payment vehicles 304 for the user.

In embodiments where multiple payment vehicles 304 are tied to the same underlying set of underlying funding accounts, and in particular where the funding rules reside on payment vehicle 304 itself (e.g., where the rules are stored in the memory of a smartphone and payments are made using a mobile payment app, or when the rules are stored in the memory of a chip-and-PIN smartcard used to make the payments), each payment vehicle 304 may have its own rules data store with distinct rules for that payment vehicle. For example, each member of a married couple might each use their own separate funding account for a first class of purchases, a shared account for a second class of purchases, and have access to the other's accounts for emergencies. In other embodiments, rules are shared in common for all payment vehicles 304 tied to the same set of underlying funding accounts.

B. Payment Processing

Figure 4:
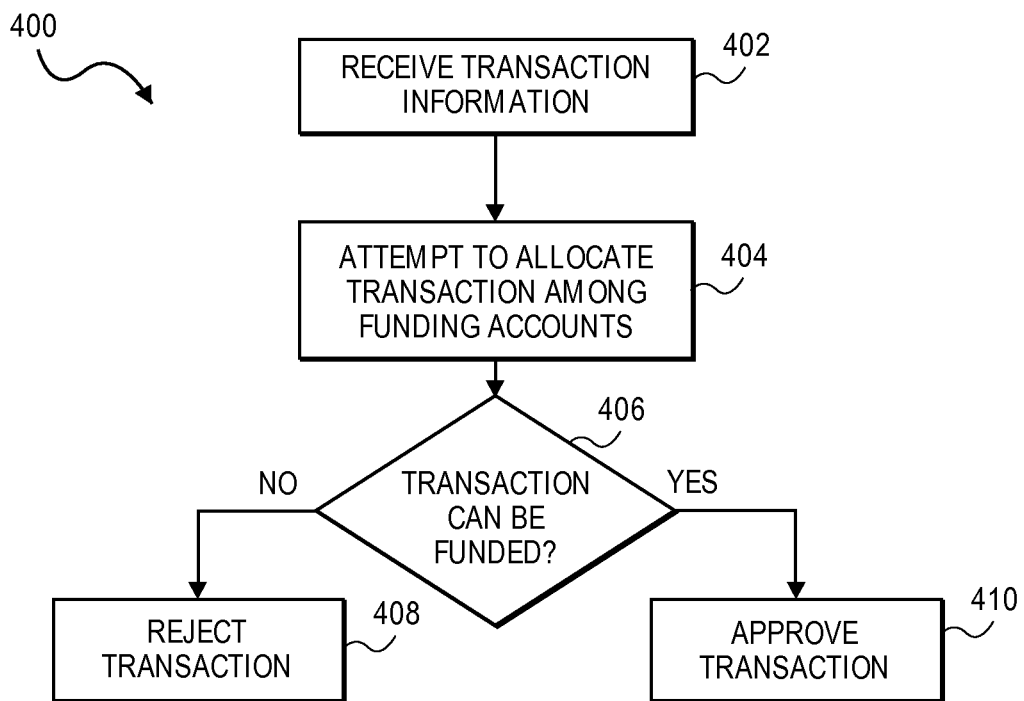
FIG. 4 depicts a method of processing a payment in accordance with embodiments of the invention.

Turning now to FIG. 4, a method of processing a payment in accordance with embodiments of the invention is depicted and referred to generally by reference numeral 400. Method 400 begins at a step 402, where transaction information is received from the merchant. The transaction information broadly includes a payment amount and may include additional information that can be used in the allocation of the payment to funding. For example, the transaction information may include a merchant category and/or merchant identifier. The transaction information may also include one or more categories for the goods or services that are the subject matter of the transaction as well, as opposed to generally applicable to the merchant. Thus, for example, the merchant category for an oil change at a Wal-Mart might be "grocery," (since Wal-Mart generally is categorized as a grocery store for the purposes) the merchant identifier might be "Wal-Mart," and the transaction category might be "automotive services" (since this particular transaction relates to automotive services as opposed to groceries). In some embodiments, the user might be able to supply additional information (such as a category for the transaction) as part of the payment process that supplements or overrides the information supplied by the merchant. For example, the user might be able to override the automatically supplied merchant or transaction category for a particular transaction at the point-of-sale. In some embodiments of the invention, this information is received by a funding account selector, such as funding account selector 214 or funding account selector 306, which can be located at a variety of locations throughout the payment-processing network. In other embodiments, the user can generally override the merchant category for a particular merchant for all transaction at that merchant. For example, if Wal-Mart's merchant category is "grocery," but a particular user only ever purchases automotive services there, the user can generally override Wal-Mart's merchant category to reflect that.

At step 404, an allocation of the payment across funding accounts according to the rules in the rule data store is attempted. The rules for determining the allocation can be based on any data included in the transaction information. However, allocation of payments among funding accounts can also be based on information intrinsic to the funding accounts, such as the details of their rewards programs. For example, the user may configure rules to allocate payments first to a particular credit card with the highest cash rewards rate. Once the available balance on that credit card is exhausted, the payment may then be allocated to another card with the next highest rate, and so on. Because some funding accounts may offer rewards programs only for particular merchant categories or individual merchants, the allocation may differ from transaction to transaction even before the balance on a funding account is exhausted. Furthermore, rewards programs may be capped at a certain amount that can be reached before the available credit is exhausted, which may also affect the allocation of funds. In addition, payments can be divided between more than one funding account if no single account has sufficient credit available (i.e., the available credit limits can be aggregated), or if doing so would result in an increased cash reward, or if the user has otherwise configured rules for doing so. One of skill in the art will appreciate that different payments, to the same or to different merchants may be allocated differently among the funding accounts. Furthermore, multiple payment vehicles accessing the same set of rules and funding accounts (e.g., multiple cards for the same account) may allocate fund differently among the funding accounts based on the particular payment vehicle itself. Configuring and applying rules for allocating payments across funding account is discussed in greater detail below with respect to FIGS. 5 and 6.

Next, at decision 406, it is determined whether any allocation of the payment across the funding accounts satisfies the rules configured by the user. If no such allocation exists (for example, because the total credit remaining to the user is less than the payment amount), processing moves to step 408, where the transaction is rejected. On the other hand, if the transaction was successfully allocated among the funding accounts, processing instead moves to step 410. At step 408, the transaction is rejected. In some embodiments, the reason for the rejection is specified to the user. In some embodiments, this rejection is made before the payment is submitted to the merchant point-of-sale, while in other embodiments, the payment is submitted to the merchant point-of-sale, the allocation is performed at the payment clearing house or the financial institution, and the rejection is transmitted back to the user via the merchant point-of sale.

At step 410, the transaction is approved, which allows the user's purchase to proceed. If the funding account selector resides on the payment vehicle, this transaction approval can result in one or more conventional transactions being submitted through the merchant point-of sale according to the allocation determined at step 404. This may also cause stored information regarding the funding accounts (e.g., the rewards accrued and the credit balances remaining) to be updated. If, on the other hand, the funding account selector resides at a financial institution such as financial institution 316 or a payment clearinghouse such as payment clearinghouse 314, then this transaction approval may take the form of a conventional transaction approval as known in the art.

Although FIG. 4 depicts method 400 as having certain steps, embodiments of the inventions may only include some of these steps, or may include other steps not depicted. For example, step 404 may then be followed by the elements of step 410 involving updating the balances of the funding accounts, with the transmission of the transaction approval sent by another actor. Such embodiments, as well as other combinations of steps and substeps, are contemplated as being within the scope of the invention.

C. Funding Accounts and Rules

Figure 5:
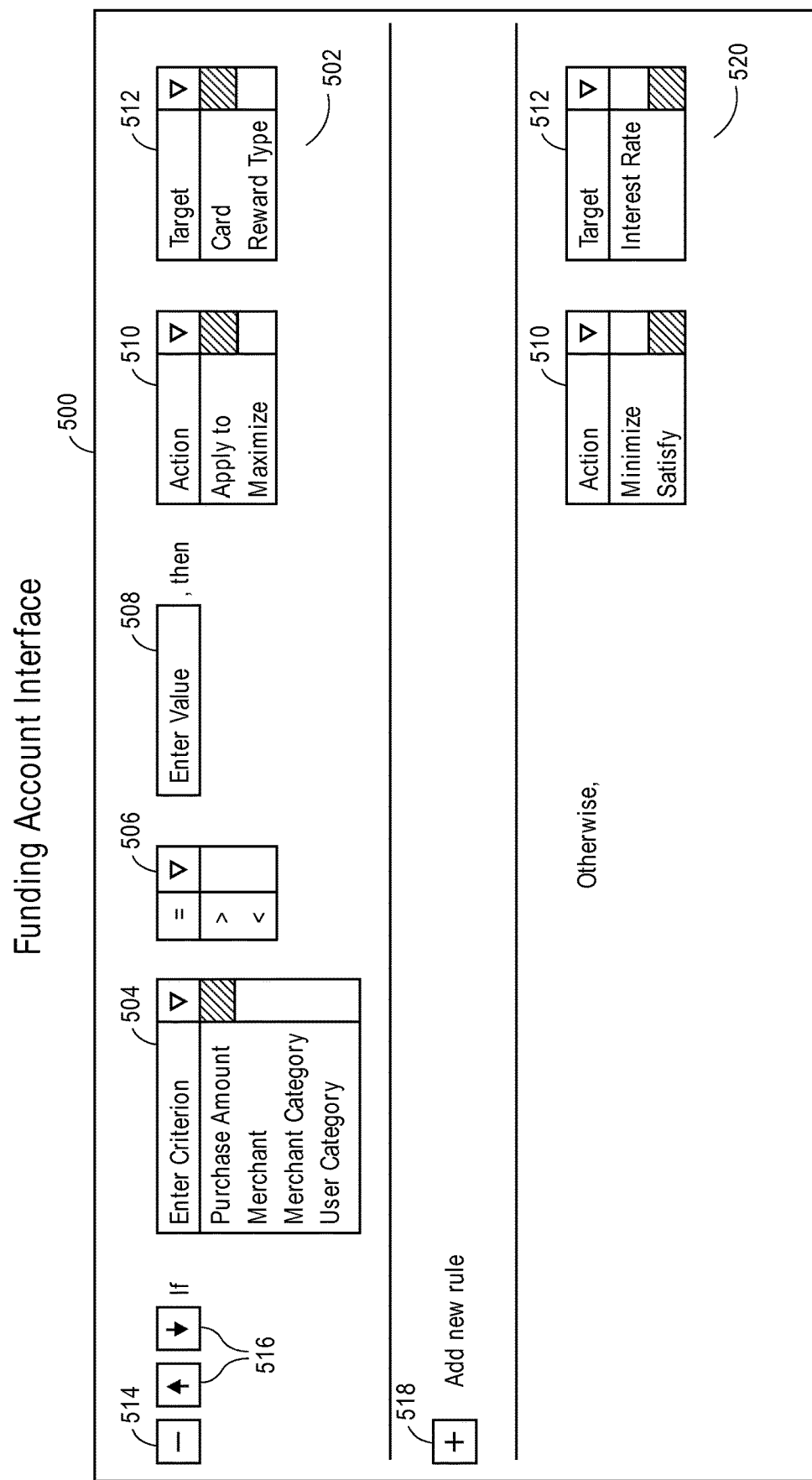
FIG. 5 depicts an exemplary interface for allowing a user to configure funding account rules.

Turning now to FIG. 5, an exemplary interface for allowing a user to configure funding account rules is depicted and referred to generally by reference numeral 500. In some embodiments, the invention is operable with only a single rule. In other embodiments, a plurality of rules are employed. Rule 502, as depicted, is in the process of being configured, and includes various exemplary parameters useable when creating a rule. In some embodiments, a rule such as rule 502 begins with a condition, comprising a criterion 504, a relation 506, and a value 508, and concludes with an allocation, comprising an action 510 and a target 512. Each of these components is discussed in greater detail below, with exemplary values that might be used in constructing a rule. However, these exemplary values are intended to be illustrative rather than exhaustive, and values other than those listed are contemplated and considered to be within the scope of embodiments of the invention.

Criterion 504 can be, as discussed above, any value included in the transaction information provided by the merchant point-of-sale, values intrinsic to the funding accounts, or some other value. Depicted in FIG. 5 is a dropdown menu from which the user can select the criterion for the rule, including values for the amount of the purchase, the particular merchant, the merchant category, or a user-supplied transaction category. Other possible values include a current account balance for a particular funding account, an available account balance for a particular funding account, and a merchant-supplied transaction category. Other methods for the user to enter the criterion, such as free-form entry, radio buttons, and so forth, are also contemplated as ways of allowing the user to select the criterion.

Relation 506 specifies the relation between the criterion and the value 508 that must be met before the rule is applied. For example, if the "equals" relation is selected by the user, then the criterion must match the value exactly for the rule to be applied. Other relations allow rules to be configured, for example, to match purchase amounts above or below a certain threshold. Other relations not depicted (e.g., "is not equal to") are also contemplated as being within the scope of the invention. In some embodiments, not all relations are applicable to all criteria and may be automatically removed from the list when an inapplicable criterion is selected.

Value 508 is entered by the user to define the value that the criterion must satisfy before the rule is matched. In some embodiments, value 508 is entered as a free-form text entry. In others, possible values are populated into a drop-down menu. In still other embodiments, the entry for value 508 changes depending on the criterion selected. For example, if the criterion is "merchant category," a drop down including "grocery," "gas," and the other merchant categories might be provided, while a criterion of "merchant" might allow free-form text entry and a criterion of "purchase amount" might allow numeric text entry. In some embodiments, a special value of "any" is available that will match any value for the criterion. Thus, one complete condition might be "If merchant is Wal-Mart" and another might be "If purchase amount is less than $10.00." Of course, the flexibility of the funding account interface allows the user to specify a virtually limitless number of potential conditions. In some embodiments, some or all of the elements of the condition (or allocation) are fixed in the template provided to the user and cannot be altered.

In some embodiments, advanced rules can also be constructed. For example, compound conditionals can also be formed, linked by Boolean operators. For example, a user could create a rule to be applied "If the merchant is Wal-Mart AND the purchase amount is less than $10.00." Other types of compound conditionals, such as those linked by the Boolean "OR" operator will be immediately apparent to one of skill in the art, and are also contemplated as being within the scope of the invention. As another example, temporary rules may be present in some embodiments, which only apply for a limited time, or until they have allocated a particular amount of funds.

The allocation portion of a rule begins with the action 510 to take. For example, a given payment might be applied against the funding account specified by target 512. In some embodiments, the "apply to" action further allows the user to specify a portion of the payment (either as an absolute amount or a percentage of the total payment). Thus, by combining rules as described in greater detail below, a user could allocate 25% of grocery payments to a first funding account, 30% to a second account, 40% to a third account, and the remaining 5% to a final account.

Alternatively, action 510 might specify that the payment is to be applied against whichever funding account will maximize a particular reward type specified by target 512. In such a case, the allocation could consider the various rewards programs available and the particular transaction to determine which maximizes the particular reward type. For example, a first credit card might offer 1% cash rewards on all transactions and a second might offer 2% cash rewards on grocery purchases, but only 0.5% on other transactions. Thus, the same action to maximize cash rewards would allocate a payment for a gas purchase to the first card, but a grocery purchase to the second card. Similar reward maximization can also be performed for other reward types such as airline miles. Another example of an action might be to minimize a target, such as an interest rate, or fees that are charged in a month with no purchases. Similarly, particular funding accounts or reward programs may have requirements that must be satisfied. For example, a particular card might have a minimum annual purchase requirement, and purchases could be allocated to this card until that minimum is met.

Rule 502 can be further configured using buttons 514 and 516. Button 514 allows the user to delete a rule that they have created if it is no longer desired, while buttons 516 allow the user to move the rule up and down in the order of rule application when multiple rules are present. For example, button 518 can be used to add another rule to the funding account interface, which can be either applied before or after rule 502. Using buttons 516, the user can configure which rule is applied first. Thus, a user might configure a first rule to maximize cash rewards, a second rule to maximize airline miles, and a third rule to minimize interest. According to these rules, payments would be allocated first to the funding accounts that offered cash rewards, in decreasing order of reward amount, until the credit for all such accounts is exhausted (or until they reach the cap for their rewards programs), then begin allocating transaction to accounts that offer airline miles until those accounts reach their limits, and finally across all accounts, regardless of their rewards programs, in order of increasing interest rate charges. If the user later begins carrying balances and decides that interest rate is more important than rewards, the third rule can be move up in the list such that it is applied first. In some embodiments, if more than one account satisfies a first rule equally, the tie can be broken by a later rule. In other embodiments, if two accounts satisfy a rule equally, a transaction can be allocated equally between them. In some embodiments, the user may be able to specify that certain airlines are preferred, and that miles with those airlines are to be preferred over miles with non-preferred airlines. In some such embodiments, the user may be able to specify that, for example, miles with a preferred airline are to be maximized first, then cash rewards, and then miles with a non-preferred airline.

Finally, some embodiments include a default rule 520 that can be applied if no other rules are satisfied. As shown, default rule 520 has no condition, and will accordingly be satisfied for any transaction that is not satisfied by any other rule. In some embodiments, more than one default rule can be present for tie-breaking purposes.

In some embodiments, a user can also select from a variety of preconfigured default or non-default rules to ease the configuration process. In other embodiments, rules can be automatically generated. For example, the user may be able to select from a variety of general preferences, such as "maximize my financial benefit" or "minimize my interest and fees." Based on the general preferences and the details of the user's available funding accounts, rules can be automatically populated to satisfy the user's preferences. Where different rewards program offer different types of rewards, this can be accomplished by establishing conversion factors between the different types of rewards (e.g., 100 airline miles are worth $1 in cash rewards). In some such embodiments, a higher financial rewards rate might be offset by a higher interest rate when determining a funding account, or vice versa. In some such embodiments, the conversion rates between types of rewards can be dynamic, and change based on a variety of factors including time of purchase, airline, or accrued rewards balance. For example, the user may specify that they are planning a trip on a particular airline to a particular destination, resulting in a temporarily increased conversion rate for miles on that airline until sufficient miles have been accrued to purchase the desired ticket. Other factors for temporarily or permanently adjusting conversion rates are also contemplated as being within the scope of the invention.

One of skill in the art will appreciate that a variety of methods of configuring funding account rules equivalent to the above-described interface exist and are contemplated as being within the scope of the invention.

D. Account List

Figure 6:
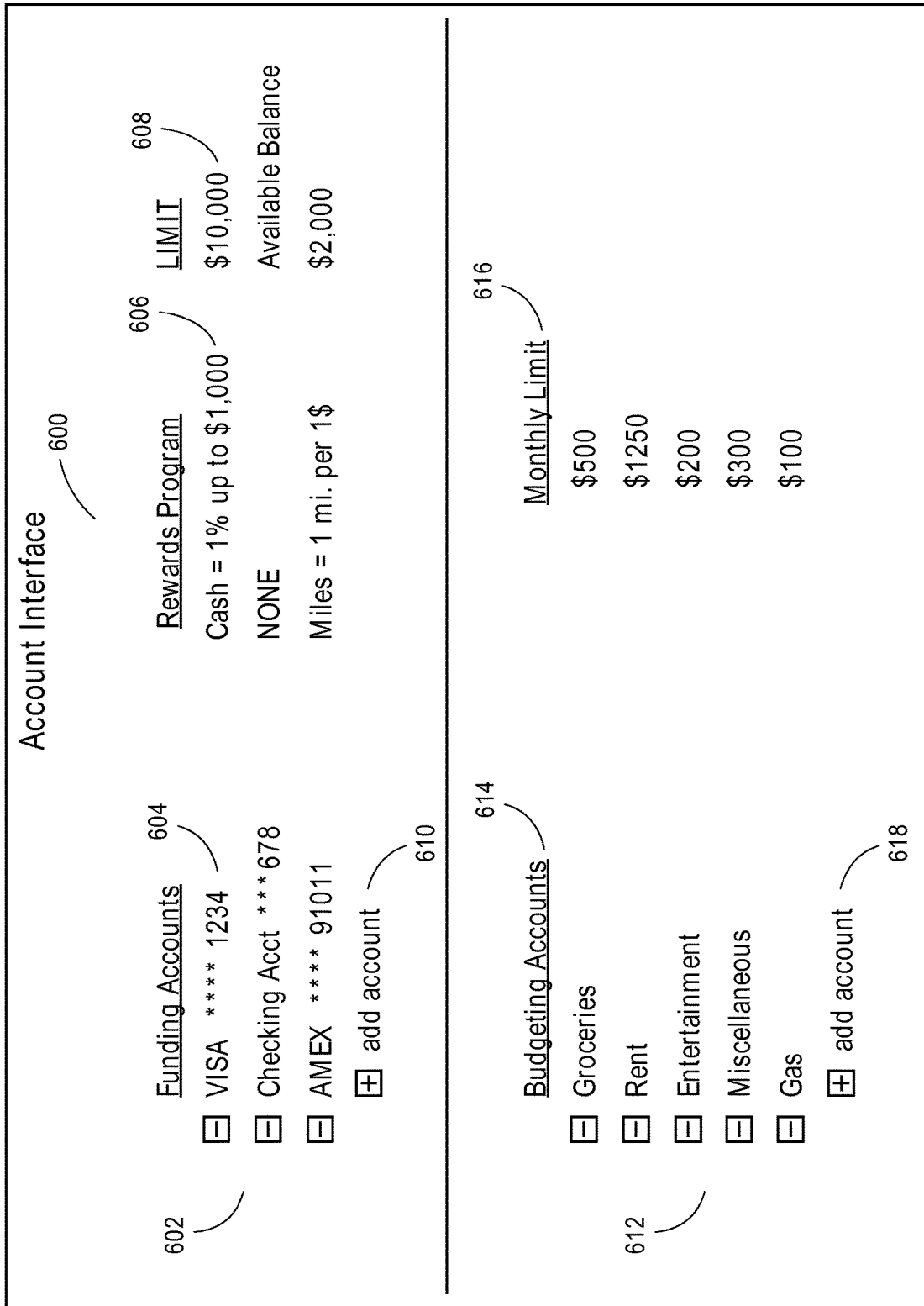
FIG. 6 depicts an exemplary interface for allowing a user to view, add, and delete funding and budgeting accounts.

Turning briefly to FIG. 6, an exemplary interface for allowing a user to view, add, and delete funding accounts is depicted and referred to generally by reference numeral 600. Interface 600 includes list of funding accounts 602. In some embodiments, the invention is operable with only a single funding finding interface. In other embodiments, a plurality of funding accounts can be used. When entering a funding account, the user specifies the account type and number 604, as needed to charge transactions against that account, the details of any rewards program associated with the account 606, and the credit limit 608. A funding account may have multiple types of reward programs available. For example, a given credit card may offer 5% cash back on gas purchases, and 1% back on other transactions. Furthermore, these rewards programs may be limited by date or by value; for example, a card could offer 5% back on all grocery purchases up to a maximum of $1,000 during the month of May. As discussed above, a user may have certain preferred airlines for miles rewards programs; in some such embodiments, the user may specify such preferred airlines (or rank airlines in order of preference) in interface 600 as well.

Alternatively, one card may require a certain minimum dollar amount of purchases within a pre-set time period to obtain a particular benefit, such as a lump payment of points on the card. In some embodiments, the user specifies these rewards programs when adding the funding account or adds them later. In other embodiments, the details of the rewards programs may be automatically imported, such as from the corresponding financial institution. In some embodiments, additional information about the funding account such as fees, minimum charges, etc. can also be specified in the account interface to allow the funding account to be allocated more accurately. In some embodiments, the details provided about the funding accounts in the interface 600 determine the actions the user can specify in the funding account interface 500. The user can also specify the credit limit 608 for the funding account. Some funding accounts may not have any pre-set credit limit, while some accounts may be limited to a corresponding balance in a bank account. The user can add additional funding accounts to funding account list 602 using add account button 610.

E. Exemplary Payment Allocation

To more clearly illustrate the operation of embodiments of the invention, an exemplary scenario is provided. A user initially enrolling in the system receives a chip-and-PIN payment card together with instructions for accessing the online portal of the issuing financial institution in order to configure funding account rules. When the user initially accesses interface 500, a single default rule has been provided to minimize interest rates. Using interface 600, the user adds two funding accounts: a first account offering 5% cash back on gas purchases, with a $1,000 credit limit and a 7% APR, and a second account offering 1.5% back on grocery purchases, also with a $1,000 credit limit and a 11% APR. The user then uses interface 500 to add a rule to maximize cash rewards for all purchases.

The user then uses the payment vehicle to make a first purchase of $40 worth of gas. When the funding account selector receives the transaction information, the merchant category of "gas" causes the user's "maximize cash rewards" rule to allocate the payment to the first funding account (which would produce a cash reward of $2). The payment vehicle therefore provides the account details corresponding to the first account to the gas station's merchant point-of-sale. If the user then makes a second purchase of $100 worth of groceries, the payment vehicle would instead provide the account details corresponding to the second account (thereby producing a cash reward of $1.50) based on this same rule.

Next, the user attempts to make a purchase of $1,500 worth of furniture using the payment vehicle. The funding account selector first determines that neither funding account has a sufficient remaining credit balance to fund the transaction, but that the combined credit limit is sufficient. Accordingly funding account selector determines that credit limit aggregation is needed for this transaction. However, it remains to be determined how much of the purchase to allocate to each funding account: $960 could be allocated to the first account and $540 to the second, $600 could be allocated to the first account and $900 to the second, or any allocation between. Accordingly, the rules data store is again consulted. Since neither funding account provides any cash rewards for this type of purchase, the rule provided by the user results in a tie, and processing proceeds to the next rule (i.e., to minimize interest rates). As the first account has a lower interest rate, the payment is allocated first to that account until its credit limit is exhausted, and then to the second account, resulting in the $960/$540 allocation described above. Of course, this exemplary scenario is purely illustrative, and many other accounts, rules, and allocations are possible within the scope of the invention, depending on the preferences of the user.

F. Method of Integration with Loyalty Programs

In some embodiments, the payment vehicle may integrate with existing loyalty programs offered by merchants in order to reduce the number of cards that must be carried by the user. For example, a particular merchant may offer an existing frequent-shopper loyalty card that a customer swipes at checkout to access frequent-shopper discounts or "buy-N-get one free" programs, or require that customers scan a membership card before making purchases. Such cards can be loaded onto the payment vehicle. Then, when making a purchase, the appropriate loyalty program information can be reproduced for presentation to the cashier or point of sale. For example, if the loyalty program information is a barcode, the barcode may be reproduced on the display of a smartphone or a dedicated display (e.g., an e-Ink display) on a payment card. Similarly, information derived from magnetic-stripe cards can be transmitted to the merchant point-of-sale in the same way that payment information is transmitted and in embodiments where the payment vehicle is a chip-and-pin card, rewards program information can be stored in the memory of the card and transmitted to the chip-and-pin reader when the user makes a purchase. In some embodiments, a magnetic stripe option might require multiple swipes (for example, a first swipe to transmit loyalty card information and a second swipe to transmit payment information); in other embodiments, all relevant information can be transmitted in a single swipe.

Figure 7:
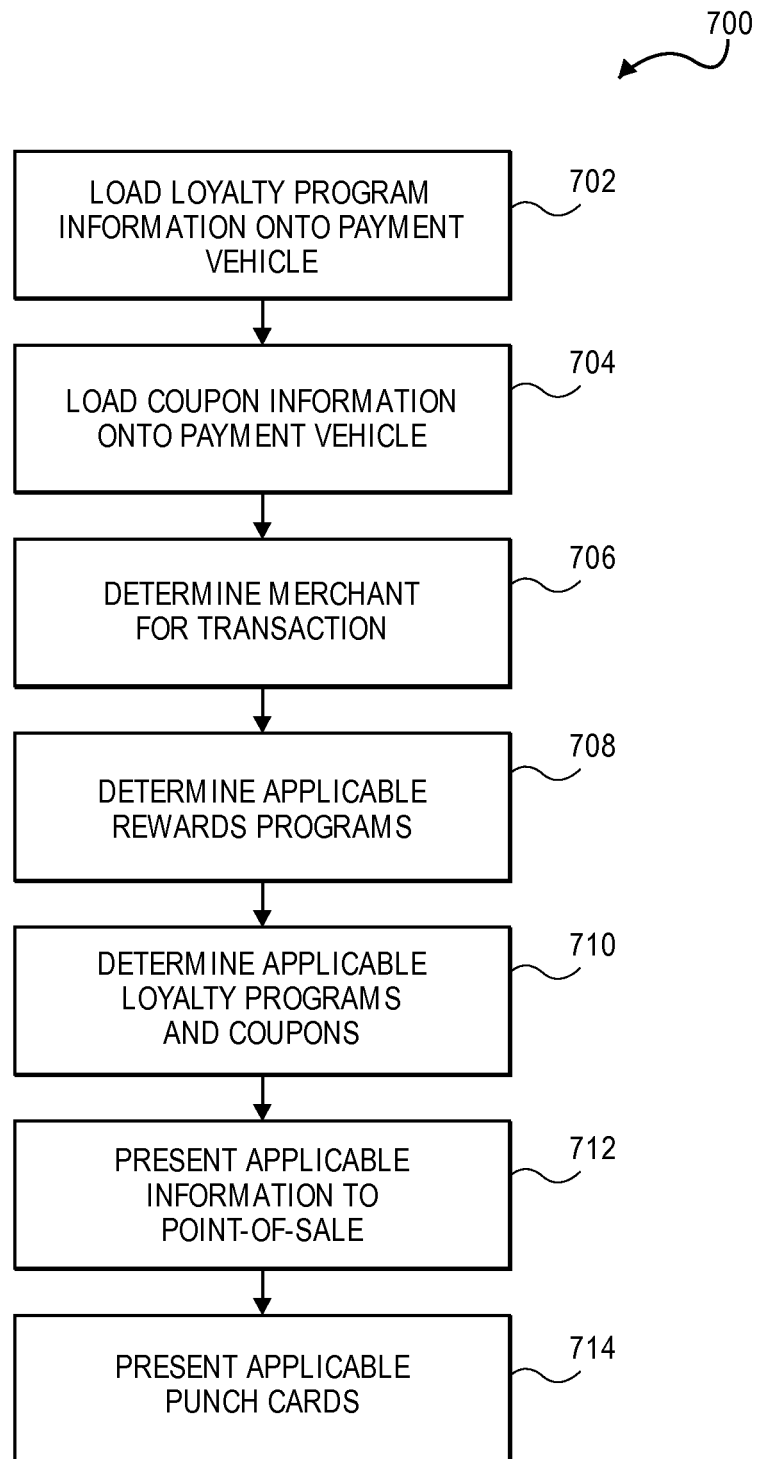
FIG. 7 depicts a flowchart illustrating the operation of a method of integrating with merchant loyalty programs in accordance with embodiments of the invention.

Turning now to FIG. 7, a flowchart 700 illustrating the operation of a method in accordance with embodiments of the invention is depicted. Initially, at a step 702, loyalty program information is loaded onto the payment vehicle. For some forms of the payment vehicle, the user may load loyalty program information directly onto the payment vehicle. For example, where the payment vehicle is a mobile payment app loaded on a smartphone, the user may use the smartphone camera to scan and decode barcodes from frequent shopper cards. Similarly, images of punch cards can be captured and stored on the payment vehicle for future use. Other types of loyalty programs (such as those that use a magnetic stripe card) can be loaded onto the payment vehicle using loyalty program interface 800. In other embodiments, all loyalty program information is loaded onto the payment vehicle using loyalty program interface 800. Other ways of loading loyalty program information into the system in such a way that it can be reproduced by the payment vehicle on demand, now known or later developed, are contemplated as being within the scope of the invention.

Next, at a step 704, other transaction-related information can be loaded onto the payment vehicle for use during the transaction in a similar way. For example, coupons can be loaded onto the payment vehicle in the same way as the loyalty programs cards described above. Because coupons generally include bar codes identifying the relevant manufacturer, product, discount and other information, the corresponding numeric information can be provided to the point of sale in whatever form of communication is used by the payment vehicle. Furthermore, users can be provided with coupons and other redeemable offers via loyalty program interface 800 that can be loaded onto payment vehicle without a physical coupon to scan.

In some embodiments, it may be necessary to know the merchant in order to determine the appropriate funding account, budgeting account, reserved funding account, loyalty program information, and/or coupon information to present as a part of the transaction. This can be determined, in one of a number of ways, at step 706. In some embodiments, the merchant point-of-sale can provide the merchant identifier to the payment vehicle when the transaction is initiated. In other embodiments, the merchant can be identified by the user via an interface on the payment vehicle. In still other embodiments, the payment vehicle can itself identify the merchant. For example, a global positioning system in a smartphone could determine a geographic location for the transaction, which could in turn be used to determine a merchant. In other embodiments, a merchant could include a beacon in their point-of-sale that advertises wirelessly (e.g. via near-field communication or Bluetooth communication) a merchant identifier. In yet other embodiments, a quick-response (QR) code can be provided that a camera in a smartphone can decode to determine the merchant. In some embodiments, determining the merchant so as to identify the applicable accounts need not happen until account reconciliation occurs.

Once the merchant has been identified, the applicable rewards programs may be determined in some embodiments at step 708. In some embodiments, the rewards programs applicable to the purchase may depend on the merchant; in others they may not, as described elsewhere. In some embodiments, rewards programs associated with one or more reserved funds accounts may be identified at this step. In some embodiments, one or more merchant rewards programs may be identified at this step. In some embodiments, one or more rewards program based on the funding accounts are determined. In some embodiments, the rewards programs available to the user given the merchant may be presented to the user once they have been determined. In other embodiments, some or all of the rewards programs applicable to a given transaction may not be determined until the transaction processes or is reconciled.

Similarly, at this point the relevant loyalty programs can be identified based on the merchant identifier at step 710. For example, if the user has a frequent-shopper card with the merchant, it may be made available for scanning or otherwise presentment to the point-of-sale. In addition, any punch-card style "buy-N-get-one-free" programs offered by the merchant may be presented to the user at this stage to remind them of their availability. In some embodiments, the individual products relevant to any coupons or loyalty programs are identified. In some such embodiments, this can be done once the user has completed their shopping and presented their purchases for checkout. In other such embodiments, when the user arrives at the merchant, the relevant products can be presented to the user in advance as a reminder. For example, if the user has completed a punch card and is entitled to a free latte at Starbucks, they may be alerted to that fact when they next enter a Starbucks. Finally, at this step, any coupons applicable to the merchant can be identified at this step. Coupons applicable to the merchant may include coupons specific to the merchant (e.g., a coupon for 10% off the purchase of any one item at the merchant) or coupons for products that might be purchased at the merchant (e.g., a manufacturer coupon for $1.00 off a particular brand of cereal might be presented at any grocery store). In some embodiments, the user can select which coupons or loyalty programs to present at this step.

Next, at step 712, the payment vehicle can present all of the determined information to the merchant point-of-sale. For example, where the payment vehicle is a smartphone-based mobile payment app, the user might first scan a barcode on the screen to activate their loyalty program account, then scan another series of barcodes corresponding to coupons for the merchant or products they have purchased as part of the transaction, and finally use a near-field communication (NFC) protocol to transfer funding account information to the merchant. As another example, a payment card could include an e-Ink screen to display bar codes for coupons, a programmable magnetic stripe that can be swiped to activate swipe-based loyalty programs, and a chip-and-pin interface to transmit funding account information. In some embodiments, coupons may be deleted from the payment vehicle when they are redeemed. Other methods of communicating with the merchant point-of-sale and of interfacing with the user, now known or later devised, are also contemplated as being within the scope of the present invention.

At step 714, the payment vehicle can also present relevant punch-card style "buy-N-get-one-free" programs for validation by the merchant point-of-sale and/or the cashier in some embodiments. In some such embodiments, the payment vehicle interacts with merchant point-of-sale to automatically validate the relevant punch cards. In other embodiments, the payment vehicle is used for manual purchase validation (e.g., by allowing the cashier to initial the touch screen of a smartphone or by using a phone to capture a quick-response code validating the purchase). In some embodiments the payment vehicle interacts with the merchant point-of-sale to determine whether any punch-card eligible purchases were made as part of the transaction. In other embodiments, the user makes this determination by selecting or not selecting the punch card at a previous step.

G. Interface for Loyalty Programs

Figure 8:
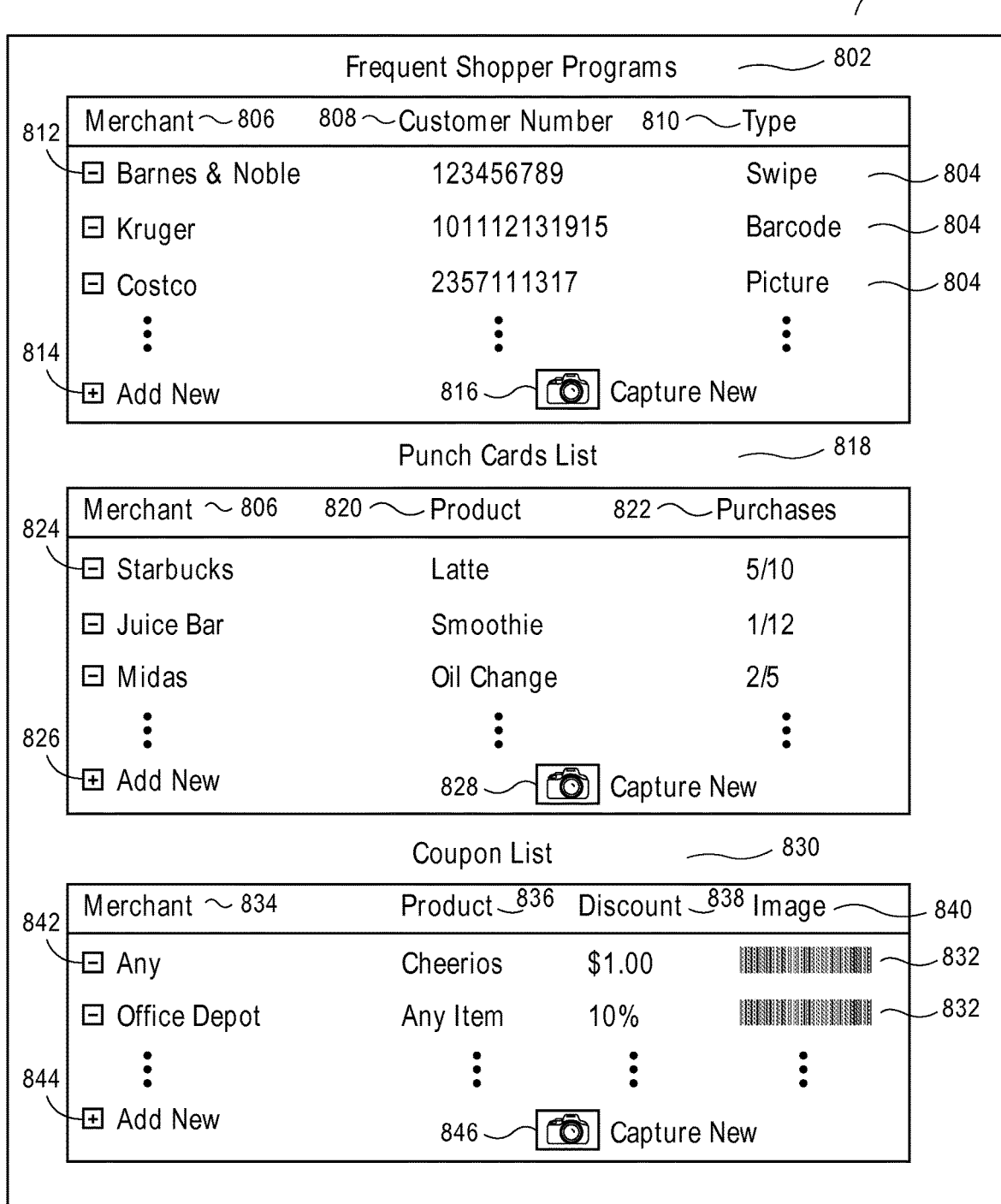
FIG. 8 depicts an exemplary interface for managing customer loyalty programs.

Turning now to FIG. 8, an exemplary interface for managing customer loyalty programs is depicted, and referred to generally by reference numeral 800. Interface 800 broadly includes frequent shopper program list 802 and punch card list 818. Frequent shopper program list 802 includes a one or more frequent shopper programs 804. Each frequent shopper program 804 includes fields 806, which lists the name of the merchant providing the frequent shopper program; 808, which lists the customer identification number associated with the user for the particular frequent shopper program; and field 810, which lists the way in which this program should be presented to the point-of-sale. For example, a first frequent shopper program could be represented by a barcode, which is displayed on the payment vehicle in a number of ways as discussed above; a second frequent shopper program could require that an image of the membership card (which could, for example, include a picture of the user and bar codes and/or QR codes encoding the member ID); and a third could require that a magnetic stripe be swiped. Each frequent shopper program may also include a "delete" button 812 to remove the frequent shopper program in the event the user leaves that program.

Frequent shopper program list 802 further includes "add" button 814 to allow the user to load additional frequent shopper programs onto the payment vehicle by entering the relevant information for fields 806, 808 and 810. In some embodiments, add button 814 may be supplemented by "capture" button 816. Capture button 816 may provide for the automatic import of the relevant information from a physical frequent shopper card by, for example, capturing an image of the card, performing image recognition to determine a merchant based on the logo to populate field 806, decoding the bar code or printed customer number to populate field 808, and automatically determining the method of presentment based on the image and/or a stored database of frequent shopper program types.

Similarly, punch card list 818 includes fields 806 identifying the merchant, 820 identifying the type of product or products that are eligible for punches on the punch card, and 822 indicating the number of punches currently on the card and the number needed for redemption. In some embodiments, when a punch card has been redeemed, the number of punches can automatically be reset to zero. In some embodiments, multiple categories of purchases may be present for a single merchant. For example, a Starbucks punch card may have separate categories for coffees, lattes, and pastries. Each punch card may also include a delete button 824, similar to delete button 812 for a frequent shopper card, to allow the user to discard an unwanted punch card. Punch card list 818 further includes an add button 826 similar to add button 814 to allow the user to input information for new punch cards, and a capture button 828 similar to capture button 816 to allow a user to automatically import new punch cards.

In some embodiments, loyalty program interface 800 may further include coupon list 830. In other embodiments, coupon list 830 may instead be a part of a separate interface. Coupon list 830 includes one or more coupons entries 832, each of which contains the information necessary to redeem the corresponding coupon. A coupon entry 832 includes a merchant field 834 describing the merchant or merchants at which the coupon can be redeemed. For some coupons (e.g., manufacturer's coupons) the coupon may be redeemable at any merchant. A coupon entry further includes a field 836 indicating the product for which the coupon may be redeemed. Again for certain types of coupons, the coupon may be redeemable for any product at a specified merchant. In some embodiments, coupon entry 832 may further include the discount amount of the coupon either for redeeming the coupon or for presenting the coupon to the user. Coupon entry 832 further includes identity data 840 for the coupon. In some embodiments, identity data 840 may include a bar code that can be scanned when the coupon is redeemed. In other embodiments, identity data 840 may be numeric data that can be transmitted to the merchant point-of-sale, converted to a barcode for display, or otherwise presented at redemption. In still other embodiments, such as the depicted embodiment, identity data 840 may instead be an image of the coupon for display on a screen of the payment vehicle when the coupon is redeemed. Coupon list 830 may also include delete buttons 842 to allow a user to discard a coupon, add button 844 to allow a user to load a new coupon onto the payment vehicle, and capture button 846 to allow a user to automatically import a coupon by capturing its image, scanning its barcode, or other ways.

One of skill in the art will immediately recognize that other ways of presenting the information in loyalty program interface 800 are also possible. For example, frequent shopper program list 802, punch card list 818, and coupon list 830 can be presented separately or in any combination. Similarly each of these lists can include more, fewer, or different fields than shown. Such variations that allow equivalent presentation and manipulation of the information are also contemplated as being within the scope of the invention.

IV. Payment Vehicle for Budgeting

At a high level, embodiments of the invention provide for a payment vehicle that includes a plurality of virtual budgeting accounts to which deposits can be allocated and from which payments can be automatically deducted based on transaction information and rules configured by the user. For example, when loading funds onto the payment vehicle, the user can allocate those funds among the budget accounts they have previously created. Then, when making purchases, the funds will be deducted from the appropriate virtual budgeting accounts. If insufficient funds remain in the appropriate budget account, then the card can be declined for that purchase, thereby automating the process of compliance with the user's defined budget.

Because of the ease of creating and charging purchases against budget accounts, the user can create more detailed budgets without increasing the complexity of the budgeting process. Furthermore, budget accounts can be automatically replenished when new funds are received or on a regular schedule. For example, a user who receives a lump-sum payment can configure a budget such that a portion of the funds is allocated to a given virtual budgeting account each month. Similarly, regular deposits, such as payroll deposits, can be automatically allocated among virtual budgeting accounts when they are received. Such automatic allocations can be apportioned as a dollar amount, a fraction of the deposit, or a combination of both. For example, a user could configure a monthly payroll deposit such that $100 is allocated to a "gas" virtual budgeting account, $750 is allocated to a "rent" virtual budgeting account, and the remainder is split evenly between "groceries" and "entertainment" virtual budgeting accounts. If the user then receives a $100 per month raise, then the raise would automatically split between the "groceries" and "entertainment" virtual budgeting accounts without further configuration.

A. Elements of the System

Figure 9A:
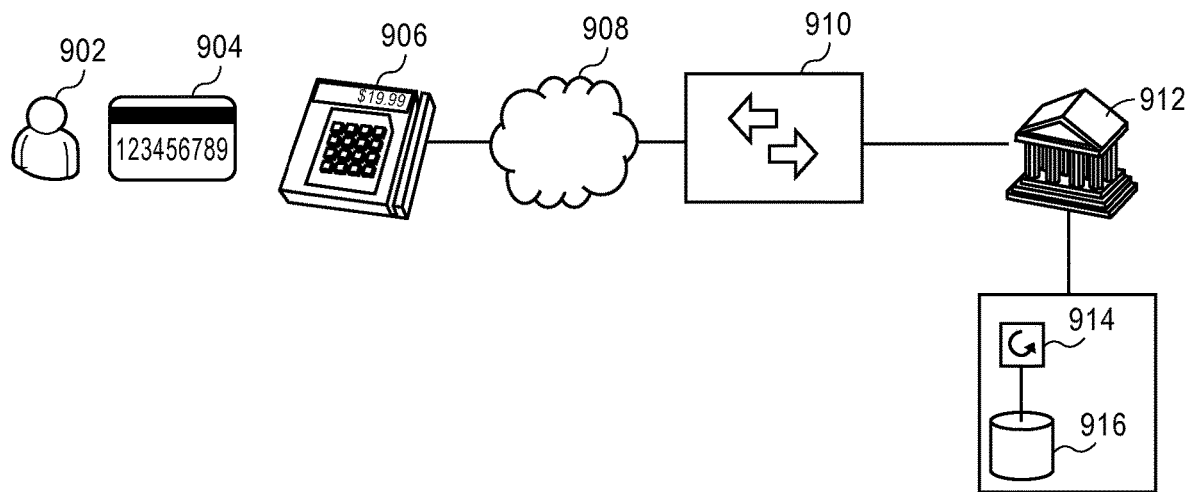
FIG. 9A depicts a system diagram including certain components used in practicing embodiments of the invention.

Turning now to FIG. 9A, a system diagram including certain components used in practicing embodiments of the invention is depicted. When completing a transaction such as a purchase, user 902 presents payment vehicle 904 to merchant point-of-sale 906. In some embodiments, payment vehicle 904 is a conventional prepaid debit card with a magnetic stripe encoding account information. In other embodiments, payment vehicle 904 is a chip-and-PIN card encoding account information with an embedded microprocessor and memory. In still other embodiments, payment vehicle 904 is a smartphone app for mobile payments storing account information in a computer-readable medium in the smartphone. In yet other embodiments, payment vehicle 904 is a Near-Field Communications (NFC) device or RFID device that wirelessly transmits account or other payment information to point-of-sale 906. Other forms of payment vehicle, now known or later developed, as also contemplated as being within the scope of the invention. Though the embodiments of the invention below are discussed in the context of a prepaid debit card, one of skill in the art will be able to immediately apply these concepts to other forms of payment vehicle, and such embodiments are contemplated as being within the scope of the invention.

Merchant point-of-sale 906 collects transaction information from user 902 and the merchant. For example, it might receive a payment amount for the transaction and information identifying the merchant from the merchant, and account information and payment authorization information from user 902. In some embodiments, user 902 might be required to enter a PIN to authorize the transaction. In other embodiments, user 902 might authorize the transaction by providing authentication information to payment vehicle 904 (e.g., by scanning their fingerprint on a fingerprint reader), and the authorization information might not be provided to point-of-sale 906. In some embodiments, user 902 may supply additional information to determine (or override automatically determined) virtual budgeting accounts for the transaction. When point-of-sale 906 has collected the necessary transaction information, it transmits it via network 908 to payment clearinghouse 910.

Payment clearinghouse 910 serves as an interchange between merchants and financial institutions such as financial institution 912. Based on the transaction information provided by point-of-sale 906, payment clearinghouse 910 determines the appropriate financial institution 912 and verifies with financial institution 912 that user 902 has sufficient funds (in the form of available credit or account balance) to cover the payment. In some embodiments of the invention, this query can also verify that the appropriate virtual budgeting account has enough balance remaining to cover the payment using budgeting account selector 914 and rules data store 916.

Budgeting account selector 914 is responsible for determining which of the virtual budgeting accounts of user 902 should be charged for this purchase. In some embodiments, a single budgeting account selector 914 is employed for all transactions by all users, and could be located at payment clearinghouse 910. In other embodiments, financial institution 912 has its own budgeting account selector 914 for accounts drawn on that financial institution. In still other embodiments, each user of the system has an individual budgeting account selector 914, and it can be located in payment vehicle 904. Other distributions of, and locations for, budgeting account selector 914 are also contemplated as being within the scope of the invention. The process whereby budgeting account selector 914 determines the appropriate virtual budgeting account for a particular transaction is described in greater detail below, and particularly with respect to payment assignment rules interface 1200.

In the process of determining the appropriate virtual budgeting account for the transaction, budgeting account selector 914 consults rules data store 916 to retrieve the rules configured by user 902. In some embodiments, a single rules data store stores the rules for all users. In other embodiments, each financial institution 912 has a single rules data store for all of the payment vehicles it issues. In still other embodiments, each budgeting account selector 914 has a corresponding rules data store 916. In yet other embodiments, each user 902 has a dedicated rules data store 916. In some embodiments, only one rules data store 916 stores payment rules information for a given user 902. In other embodiments, the rules for a given user 902 are distributed among a plurality of rules data stores such as rules data store 916, each of which can be consulted as necessary by a budgeting account selector such as budgeting account selector 914.

Once budgeting account selector 914 determines the assigned virtual budgeting account for the transaction being conducted, it must be determined whether the balance remaining in the determined virtual budgeting account is sufficient to fund the transaction. In some embodiments, this determination is made by budget account selector 914 based on balance information stored in rules data store 916. In other embodiments, it is made by financial institution 912. In still other embodiments, a separate component maintains the balances of the virtual budgeting accounts and determines whether a given transaction satisfies the user's budget. If the transaction satisfies user 902's budgeting rules, financial institution can proceed to determine whether the payment amount for the transaction falls with the total balance remaining on the payment vehicle, and send an transaction approval to the merchant point-of-sale 906 if so.

Figure 9B:
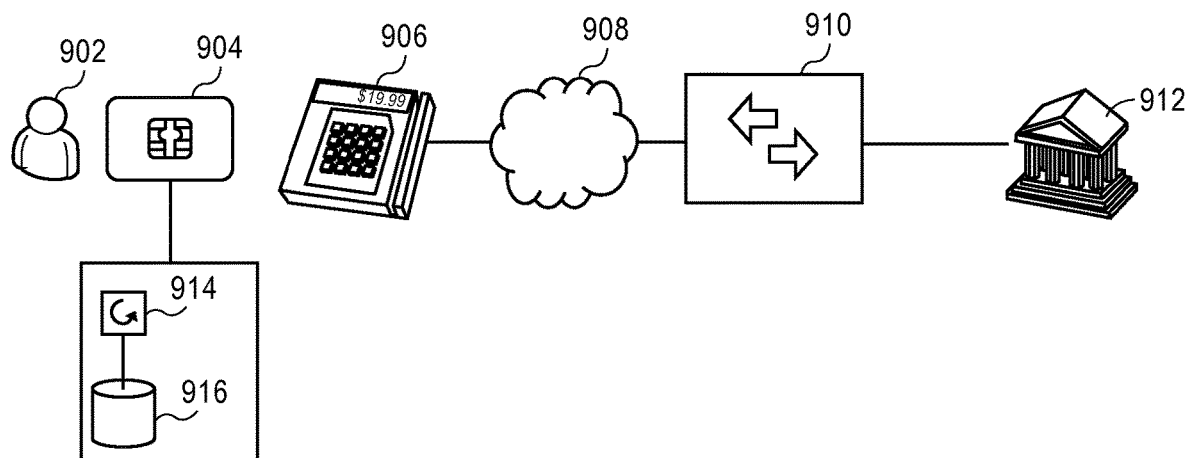
FIG. 9B depicts an alternate system diagram including an alternate arrangement of the components of FIG. 9A, as used in practicing other embodiments of the invention.

Turning now to FIG. 9B, an alternate system diagram including an alternate arrangement of the components of FIG. 9A, as used in practicing other embodiments of the invention is depicted. Where FIG. 9A depicts budgeting account selector 914 and rules data store 916 as being present at financial institution 912, FIG. 9B instead depicts them as being present on payment vehicle 904. This may be the case where, for example, payment vehicle 904 takes the form of a chip-and-PIN card (as depicted) or the form of a mobile payment app on a smartphone. As discussed elsewhere, such embodiments have the advantage that they require no changes to merchant point-of-sale 906 or financial institution 912; rather, the budgeting can take place locally and before the transaction is submitted to financial institution 912. Additionally, this may provide a more flexible user interface for the user to assign a virtual budget account (or override an automatically assigned virtual budget account) for the transaction, override a budgeting rejection, and other management functions.

B. Payment Assignment Method

Figure 10:
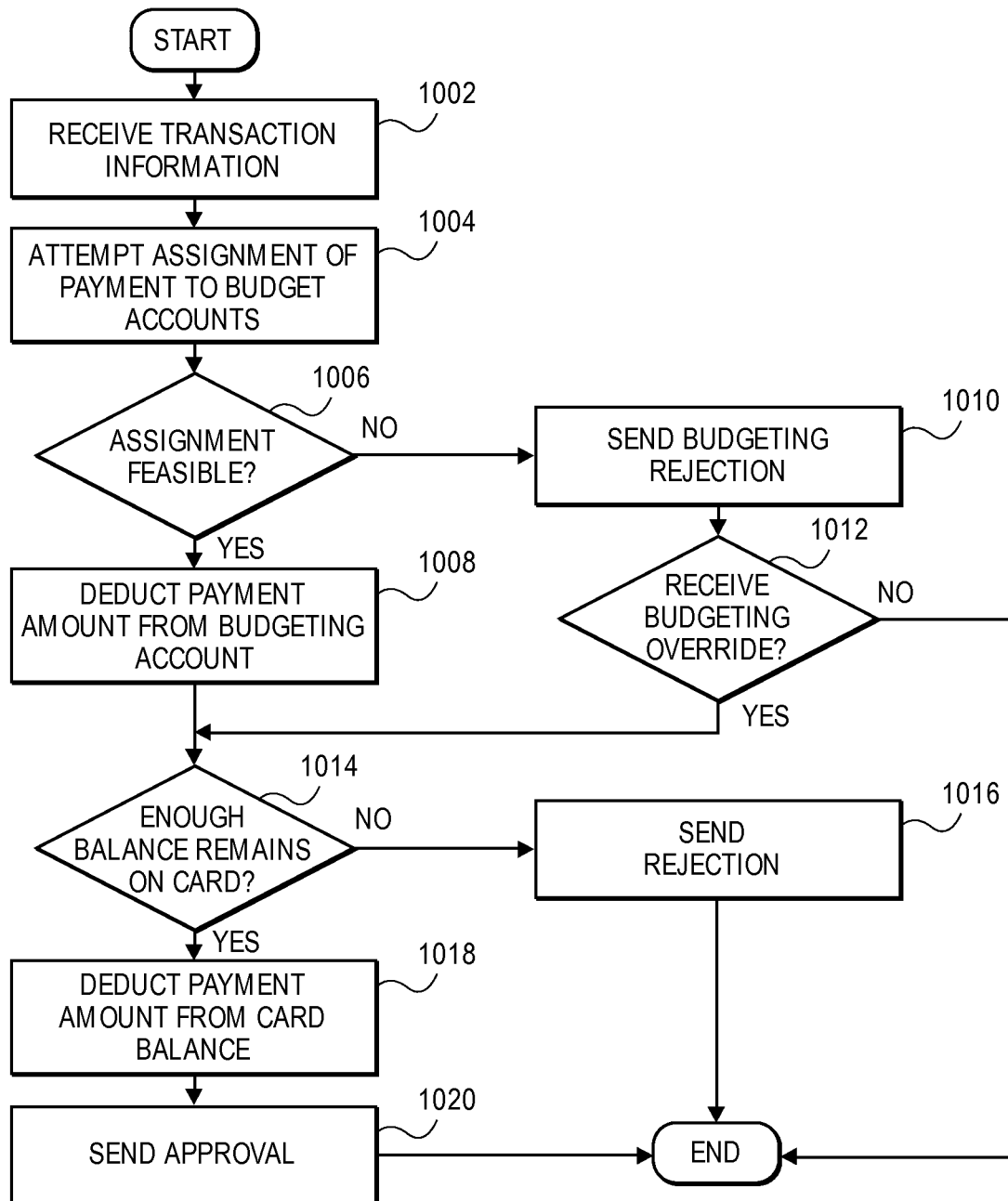
FIG. 10 depicts a flowchart depicting the operation of a method of managing a user's budget in accordance with embodiments of the invention.

Turning now to FIG. 10, a flowchart depicting the operation of a method in accordance with embodiments of the invention is depicted. The method begins at a step 1002, when transaction information is received. In some embodiments, this information is received (directly or indirectly) from point-of-sale 906. Broadly, the transaction information may include a payment amount and an identifier of the merchant that is a party to the transaction. In other embodiments, it may include additional information, such as a merchant category or information supplied by the user. Examples of such information supplied by the user include one or more budgeting account indicators to supplement or override an automatically determined virtual budgeting account, authentication and/or authorization information, and budgeting override information.

Next, at a step 1004, the payment amount is assigned to the user's virtual budgeting accounts according to rules configured by the user and/or default rules. Broadly speaking, rules comprise a condition, which determines whether they apply to a particular payment, and an assignment, which determines which virtual budgeting account or accounts the payment should be applied to. The condition may be based on any indication for a virtual budget account specified by the user. For example, merchant category, merchant name, and many other items of transaction information can act as indications for a virtual budgeting account. In some embodiments, the user can also specify the virtual budgeting account at the time of the transaction. Rules, and their conditions, are discussed in greater detail below with respect to FIG. 12. In some embodiments, multiple rules may apply to a given transaction, and payments may be assigned according to the rules jointly or in order. In some embodiments, rules may assign payments among multiple virtual budgeting accounts statically as defined by the rules or dynamically according to the details of the transaction. The assignment of payments is also discussed in greater detail below, and particularly with respect to FIG. 12.

Processing then proceeds to decision 1006, where it is determined if the payment could be assigned among the user's virtual budgeting accounts in accordance with their rules. Broadly, a payment can be assigned successfully if a feasible assignment exists; i.e., if rules exist for the user that assign the entire payment amount to one or more virtual budgeting accounts in such a way that no virtual budgeting account exceeds the funds it has available. In some embodiments, rules may allow for multiple potential assignments (some, all, or none of which may be feasible). In such embodiments, the assignment selected among multiple feasible assignments can be determined based on the ordering of the user's rules. In some embodiments, spillover rules may be permitted such that, if an otherwise-feasible assignment would cause a particular budgeting category to exceed its available funds, the excess can be deducted from a spillover account. In some such embodiments, a single shared spillover account is shared by all virtual budgeting accounts, while in other embodiments, different accounts may have different spillover accounts. If a feasible budgeting assignment exists, processing proceeds to step 1008. If no feasible budgeting assignment exists, processing instead jumps to step 1010.

At step 1008, the amount assigned to each virtual budgeting account is deducted from the remaining balance in the corresponding account. Because of the assignment determined at step 1004, these deductions will not reduce any virtual budgeting account below a zero balance. In some embodiments, the updated balances for each affected account are displayed to the user. In some embodiments, the user can, in addition or instead, log on to an online banking interface to view the balances remaining for each virtual budgeting account. Other methods of checking virtual budgeting account balances, such as an automated telephonic response system, are also contemplated and considered to be within the scope of the invention. Processing then proceeds to decision 1014.

If, at decision 1006, it was determined that no feasible budgeting assignment existed, a budgeting rejection is sent at step 1010. This budgeting rejection may take different forms for different forms of payment vehicle 904. For example, for a magnetic stripe card, the budgeting rejection may be a conventional "card declined" message. As another example, if payment vehicle 904 is a mobile payment app on a smartphone, the budgeting rejection may take the form of a pop-up or modal alert on the app indicating that the current transaction violates the user's budget. Other forms of budgeting rejection for these or other types of payment vehicle are also contemplated and considered to be within the scope of the invention. In some embodiments, budgeting rejections are "soft" rejections that can be overridden by the user. In this way, a user can make purchases in an emergency even if the transaction does not fall within their budget. In other embodiments, budgeting rejections are "hard" rejections that cannot be overridden. In still other embodiments, the user can choose to make certain virtual budgeting accounts subject to soft rejections while other virtual budgeting accounts are subject to hard rejections. In yet other embodiments, budgeting rejections are purely advisory; for example, they may cause an alert on the payment vehicle that the current transaction violates the user's budget, and it is then up to the user to proceed with the transaction or cancel it. In various embodiments, budgeting rejections may be issued by financial institution 912, by payment vehicle 904 and/or by clearing house 910, and the form of a rejection may depend on its issuer. Once the budgeting rejection has been issued, processing proceeds to decision 1012.

At decision 1012, it is determined whether a budgeting override was received from the user. As described above, some budgeting rejections may not be subject to override and processing may terminate instead. In the embodiment depicted in FIG. 10, such a budgeting override is received after the initial budgeting rejection was sent at step 1010. In other embodiments, however, the budgeting override is received with the transaction information at step 1002. In such cases, if a budgeting override was received and decision 1006 determines that no feasible assignment exists, processing may proceed directly to decision 1014. In still other embodiments, the user may have the option to provide a budgeting override either with the initial transaction information or in response to a budgeting rejection. The form of the budgeting override depends on the form of payment vehicle 904 and how (and whether) the budgeting rejection was sent at step 1010. For example, if a "card declined" message was sent to indicate a budgeting failure, then a resubmission of the same (or substantially the same) transaction information within a predetermined time period (for example, five minutes, ten minutes, or fifteen minutes) may be interpreted as a budgeting override. As another example, if the budgeting rejection took the form of a pop-up or modal alert in a smartphone app, then options may be provided to the user as part of that alert to accept or override the budgeting rejection. In some embodiments, the user may be able to specify rules for automatically generating budgeting overrides. For example, a user may specify that transactions from a given merchant should be deducted from a given virtual budgeting account if funds remain, but no transactions at that merchant should ever be rejected for budgeting reasons. Such rules can be constructed for a variety of conditions, as described below with respect to FIG. 12. Such automatic budgeting override rules can act in conjunction with, or in place of, spillover virtual budgeting accounts, as discussed elsewhere. If no budgeting override is received, the method terminates. In embodiments where no rejection was sent to the merchant at 1010, a rejection may be sent to the merchant at this point, prior to termination. If a budgeting override is received, processing instead proceeds to step 1014.

At step 1014, it is determined whether sufficient balance remains on the payment vehicle to cover the payment amount. This step may be necessary, for example, if one or more budgeting overrides have been performed for this or previous transactions. In some embodiments, decision 1014 is made by a different actor than decision 1006. For example, decision 1006 may be made by logic residing on a chip-and-PIN card or by a mobile payment app on a smartphone, while decision 1014 may be made financial institution 912. If insufficient funds remain on the payment vehicle to fund the transaction, processing proceeds to step 1016. Otherwise, if sufficient funds remain on the payment vehicle for the payment, processing instead proceeds to step 1018.

At step 1016, a rejection is sent based on insufficient funds remaining on the payment vehicle. In some embodiments, the lack of sufficient funds remaining on the payment vehicle will cause a hard rejection as opposed to the soft (i.e., overrideable) budgeting rejection caused by a virtual budgeting account lacking sufficient funds for the transaction as assigned to the user's virtual budgeting accounts by the user's rules. After the rejection is sent, the method terminates.

If, on the other hand, sufficient funds remain on the payment vehicle to fund the transaction, processing instead proceeds from decision 1014 to step 1018. At step 1018, the payment balance is deducted from the balance of the funds remaining on payment vehicle 904. One of skill in the art will appreciate that this processing operates in accordance with a conventional prepaid card or other prepaid payment vehicle. Processing then proceeds to step 1020 where the transaction is approved. In some embodiments, the transaction is approved by financial institution 912 and an approval of the transaction is sent to merchant point-of sale 906 in accordance with conventional point-of-sale processing of a prepaid card. In other embodiments, this approving takes place on payment vehicle and "approving the transaction" takes the forms of submitting the transaction to financial institution 912 for further processing. In some embodiments, an approved transaction means that the transaction satisfies the user's budget; in other embodiments, it also means that funds are available on the payment vehicle to find the transaction. It is an advantage of certain embodiments of the invention that merchant point-of-sale 906 can process payment vehicle 904 without any modification; all special processing is contained within budgeting account selector 914 and rules data store 916.

C. Budgeting Interface

Figure 11:
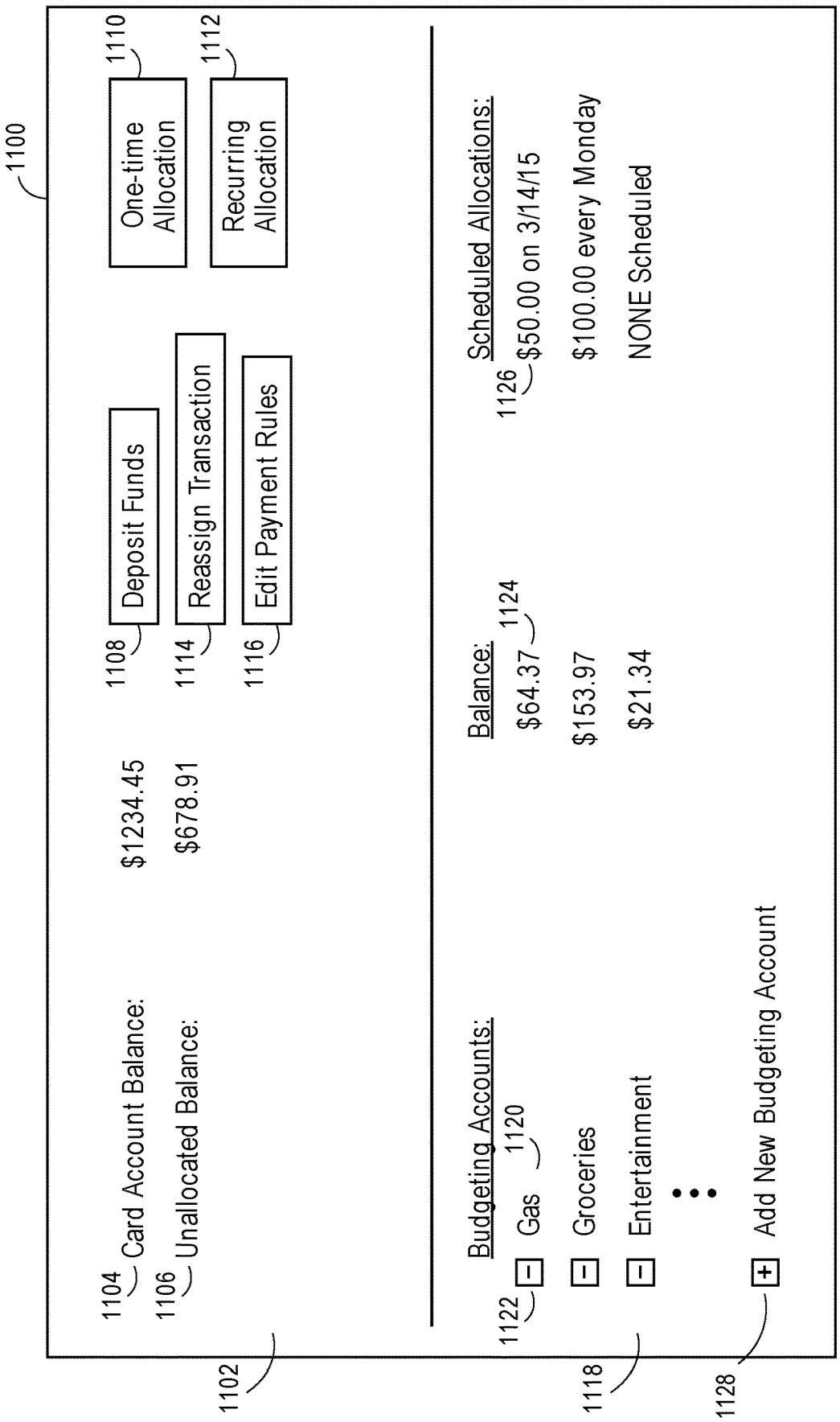
FIG. 11 depicts an exemplary budgeting interface in accordance with embodiments of the invention.

Turning now to FIG. 11, an exemplary budgeting interface in accordance with embodiments of the invention is depicted, and referred to generally by reference numeral 1100. Broadly speaking, budgeting interface 1100 allows user 902 to manage the funds on payment vehicle 904 and virtual budgeting accounts for payment vehicle 904. For example, user 902 can add funds to the payment vehicle, establish and manage virtual budgeting accounts, and view payment vehicle and virtual budgeting account balances.

Account interface 1102 allows user 902 to manage funds across the prepaid account. Information displayed for user 902 includes account balance 1104 and unallocated account balance 1106. While account balance 1104 represents the total funds available to user 902 (as on a conventional prepaid card), unallocated balance 1106 represents a pool of available funds that have not yet been apportioned to any virtual budgeting account. In some embodiments, unallocated balance 1106 corresponds to the spillover account described above. In other embodiments, a separate spillover account is included with the rest of the virtual budgeting accounts. In still other embodiments, the spillover account can be any other virtual budgeting account, which may have payments assigned to it as usual.

Account user interface 1102 may further provide user 902 with several options for managing the funds in the prepaid account. For example, button 1108 allows user 902 to reload the payment vehicle with additional funds. In some embodiments, the account of user 902 can be linked to a bank account of user 902 (either at financial institution 912 or another financial institution) such that the funds can be easily transferred, either in a single lump sum or as a recurring transfer. In other embodiments, button 1108 takes user 902 to a payment page, as is known in the art, from which the user can fund the reloading of the payment vehicle using any of the usual forms of payment made available in electronic commerce, including but not limited to credit cards, debit cards, electronic clearing house (ECH) payments, online payment services (e.g., PayPal®), gift cards, and so forth. In some embodiments, funds, once loaded onto the payment vehicle, are added both to the card balance 1104 (i.e., the balance that is checked in step 1014) and to unallocated balance 1106. In such embodiments, user 902 can then allocate the funds across one or more virtual budgeting accounts using allocation buttons 1110 and 1112.

Allocation button 1110 allows the user to make a one-time allocation of some or all of unallocated balance 1106 to one or more virtual budgeting accounts. In this way, the user can manage one-time influxes of income (e.g., a tax return) or individually manage virtual budgeting accounts each budgeting cycle for greater control. For example, a first user might allocate the tax return mentioned above in identical proportion to their usual budget; a second user might allocate it solely to budget categories without fixed expenses (e.g., to an "entertainment" category); and a third user might leave it unallocated until an unexpected expense requiring the funds arises.

Recurring allocation button 1112 instead allows the user to make recurring allocations (i.e., allocations that are repeated each budgeting cycle). For example, a user might use reload button 1108 to automatically load some or all of their paycheck onto the payment vehicle each pay period. Recurring allocation button 1112 can then be used to automatically allocate a portion of these funds to the user's budget accounts each budgeting cycle (which may or may not coincide with the pay period). Similarly, a one-time, lump-sum deposit of funds may be initially unallocated, with recurring allocations to the appropriate virtual budgeting account or accounts spread out over time. It is an advantage of such embodiments of the invention that they can completely automate the process of budgeting compliance for the user: once the steps of funding the card, allocating the funds and configuring rules for payments have been completed, the user can simply use payment vehicle 904 for all purchases, and those purchases in accordance with the user's budget will be approved, while those purchases which exceed the budget will be rejected. Furthermore, budgeting overrides can allow the user access to all of their funds in the event of an emergency, even if it violates their budget to do so.

In some embodiments, the user can choose a start date, stop date, amount to be allocated, and frequency for the recurring allocation. For example, a user could specify that one the first and fifteenth of each month, funds automatically loaded onto the card from the user's paycheck are to be distributed into the user's virtual budgeting accounts (e.g., $100 into the virtual budgeting account for gas, $200 into the virtual budgeting account for groceries, $250 into the virtual budgeting account for rent, and the remainder into the virtual budgeting account for entertainment), with the recurring allocation to start immediately and with no specified stop date. Similarly, the user could specify that a $1,000 tax refund should be initially unallocated and $100 should be allocated into the virtual budgeting account for entertainment each month for the next ten months.

Account interface 1102 may further include reassignment button 1114 allowing user 902 to alter the assignment of payments to virtual budgeting accounts. It may be the case for a given transaction that the automatically assigned budget account does not accurately reflect the user's intended budget for the transaction. For example, a user may have purchased groceries at the gas station, and wish for the payment to be deducted from the virtual budgeting account for groceries rather than the (automatically determined) virtual budgeting account for gas. As another example, if the user manually entered an incorrect virtual budgeting account when making the transaction, they can correct the error using reassignment button 1114. In some embodiments, when user 902 selects button 1114, they are presented with a list of recent transactions, including the merchant information and payment amount for the transaction together with the virtual budgeting account (or accounts) to which the payment was assigned. By selecting a transaction, the user can then choose a new budget account (or accounts) for the transaction. The balance for the previously assigned-to account can then be increased by the payment amount, and the balance for the newly assigned-to account can be decreased. In some embodiments, the user may also be provided with the option to add or change a payment assignment rule (as described in greater detail below) when re-assigning a transaction.

Account interface 1102 may further include a rules interface button 1116 for user 902 to add, edit, or delete rules assigning payments for transactions to virtual budgeting accounts. Payment assignment rules interface 1200 is described in greater detail below with respect to FIG. 12. Account interface 1102 may include more or fewer options, displays or controls than depicted in FIG. 11. One of skill in the art will appreciate that the controls and displays can be implemented in many ways other than that depicted, and all such ways of implementing the functionality described are considered to be within the scope of the invention.

Budgeting interface 1100 further includes budgeting account list 1118. Each virtual budgeting account in budgeting account list 1118 includes a name 1120 for the virtual budgeting account. In some embodiments, the user creates budgeting account name 1120 when the user adds the virtual budgeting account. In other embodiments, a number of pre-populated virtual budgeting accounts are provided for a new account as suggestions for the user in configuring their budget. Each virtual budgeting account may further be provided with a delete account button 1122 allowing the user to remove the corresponding virtual budgeting account. In some embodiments, deleting a virtual budgeting account will return any funds allocated to it to the unallocated funds balance and remove any recurring allocations for that virtual budgeting account. In some embodiments, rules in the payment assignment rules interface for allocating payments to that virtual budgeting account may also be deleted if the virtual budgeting account is deleted.

In some embodiments of the invention, a "learn" mode may be provided, accessible by a control in budgeting interface 1100. In learn mode, a users purchases are observed over a period of one or more budgeting cycles (or over any arbitrary period) to determine typical expenditures for each virtual budgeting account. In some embodiments, these virtual budgeting accounts are pre-defined virtual budgeting accounts, while in other embodiments, the user's defined virtual budgeting accounts are used instead or in addition. In this way a baseline budget can be established, either in terms of percentages of expenditures or in absolute dollar (or other currency unit) amounts, without requiring the user to manually calculate and enter the budget for each category.

Also included in budgeting account list 1118 for each virtual budgeting account is the remaining balance 1124 of funds that have been allocated to that account. In some embodiments, the remaining balance 1124 may be a selectable link allowing the user to manage the balance remaining in the virtual budgeting account by, for example, allocating additional unallocated funds to the selected virtual budgeting account, de-allocating funds previously allocated to the virtual budgeting account, or re-allocating funds from the selected virtual budgeting account to another virtual budgeting account. In some embodiments, instead of only the remaining balance 1124 allowing access to the budgeting account management interface, the entire row for the virtual budgeting account allows access. In some embodiments, additional views of the balance remaining can be presented for quick and easy comprehension by the user. For example, a gas-gauge-style full-to-empty graphic can be provided for a virtual budgeting account to represent the amount of funds initially allocated to the virtual budgeting account for the budgeting cycle that remain unspent.

Budgeting account list 1118 may further include scheduled allocations 1126 for the virtual budgeting account. In some embodiments, all scheduled and recurring allocations for the virtual budgeting account are displayed. In other embodiments, only the next allocation of funds to the virtual budgeting account is displayed. In some embodiments, the scheduled allocation shows the amount of funds and the date on which they will be allocated to the virtual budgeting account. In some embodiments, the user can select a scheduled allocation to view details of the allocation and/or edit the scheduled allocation. In some embodiments, budgeting account list 1118 further includes add account button 1128, which allows the user to add additional accounts to budgeting account list 1118, which can then be viewed and edited as with other virtual budgeting accounts.

One of skill in the art will appreciate that the interfaces, options, and displays discussed above with respect to budgeting interface 1100 can be arranged and implemented in a variety of ways. For example, account interface 1102 and budgeting account list 1118 could be presented separately as distinct interfaces to the user, or could be combined with payment assignment rules interface 1200 discussed below into a single interface. Similarly, controls and displays discussed in the context of one interface could instead or in addition be provided in another interface. All such variations and implementations of the functionality discussed herein are considered to be within the scope of the invention.

D. Budget Assignment Rules Interface

Turning now to FIG. 12, an interface for configuring rules to automatically assign payments to virtual budgeting accounts is depicted and generally referred to by reference numeral 1200. Payment assignment rules interface 1200 broadly comprises one or more rules such as rule 1202, together with controls for adding, deleting, and reordering rules. Rule 1202 is in the process of being configured, and includes various exemplary parameters useable when creating a rule. Rule 1202 begins with a condition, comprising criterion 1204, relation 1206, and value 1208, and concludes with one or more budgeting account assignments 1210, each comprising an amount 1212, amount type 1214, and virtual budgeting account 1216. Each of these components is discussed in greater detail below, with exemplary values that might be used in constructing a rule. However, these exemplary values are intended to be illustrative rather than exhaustive, and values other than those listed are contemplated and considered to be within the scope of the invention.

Criterion 1204 can be, as discussed above, any value included in the transaction information provided by the merchant point-of-sale 906, by user 902, or other value. Depicted in interface 1200 is a dropdown menu from which the user can select the criterion for the rule, including values for the amount of the purchase, the particular merchant, the merchant category, or a user-supplied transaction category. Other possible values include a current account balance for a particular virtual budgeting account, and a merchant-supplied transaction category. Other methods for the user to enter the criterion, such as free-form entry, radio button, and so forth, are also contemplated as ways of allowing the user to select the criterion.

Relation 1206 specifies the relation between the criterion 1204 and the value 1208 that must be met before the rule is applied. For example, if the user selects the "equals" relation, then the criterion must match the value exactly for the rule to be applied. Other relations allow rules to be configured, for example, to match purchase amounts above or below a certain threshold. Other relations not depicted (e.g., "is not equal to") are also contemplated as being within the scope of the invention. In some embodiments, not all relations are applicable to all criteria, and may be automatically removed from the list when an inapplicable criterion is selected.

Value 1208 is entered by the user to define the value that the criterion must satisfy before the rule is matched. In some embodiments, value 1208 is entered as a free-form text entry. In others, possible values are populated into a dropdown menu. In other embodiments, the entry for value 1208 changes depending on the criterion selected. For example, if the criterion is "merchant category," a drop down including "grocery," "gas," and the other merchant categories might be provided, while a criterion of "merchant" might allow free-form text entry and a criterion of "purchase amount" might allow numeric text entry. In some embodiments, a special value of "any" is available that will match any value for the criterion. Thus, one complete condition might be "If merchant is Wal-Mart" and another might be "If purchase amount is less than $10.00." Of course, the flexibility of payment assignment rules interface 1200 allows the user to specify a virtually limitless number of potential conditions.

In some embodiments, compound conditionals can also be formed, linked by Boolean operators. For example, a user could create a rule to be applied "if the merchant is Wal-Mart AND the purchase amount is less than $10.00." Other types of compound conditionals, such as those linked by the Boolean "OR" operator will be immediately apparent to one of skill in the art, and are also contemplated as being within the scope of the invention.

In box 1212, the user can specify an amount of the payment to apply to the account specified in dropdown menu 1216. As determined by dropdown 1214, the amount entered in amount entry box 1212 can be either a dollar (or other currency) amount or a percentage of the total payment amount for the transaction. Dropdown menu 1216 provides the user with a list of the virtual budgeting accounts the user has created to select from. Thus the user can specify first assignment 1210 to apportion a first portion of the transaction to a first budget account.

Because the first assignment 1210 may account for only a portion of the payment amount, the user may use button 1218 to add an additional assignment 1210 similar to the first assignment 1210. In some embodiments, the user can continue to add assignments until the entire payment amount for the transaction is accounted for. In other embodiments, a "remainder" assignment 1220 is provided for any unassigned amount. In some embodiments, the "remainder" assignment is instead created by entering (or selecting) a special value (e.g., "ALL") for the amount entry box 1212.

Rule 1202 can be further configured using buttons 1222 and 1224. Button 1222 allows the user to delete a rule that they have created if it is no longer desired, while buttons 1224 allow the user to move the rule up and down in the order of rule application when multiple rules are present. For example, button 1226 can be used to add another rule to payment assignment rules interface 1200, which can be either applied before or after rule 1202. Using buttons 1224, the user can configure which rule is applied first. Thus, a user might have an existing rule assigning transactions with a merchant category of "grocery" to a budget account for groceries, but add a rule specifying that if the merchant identifier is "Wal-Mart," then the payment should instead be assigned to a budget account for general purchases. Using buttons 1224, user 902 can then specify that this new rule should be applied before the existing rule, which would otherwise assign the transaction contrary to the user's wishes.

In some embodiments, payment assignment rules interface 1200 may be prepopulated with one or more rules to ease the process of initially configuring a budget for user 902. For example, a rule assigning any transaction with a merchant category of "grocery" to a budgeting category for groceries (which can also be pre-created for the user as discussed above) can be prepopulated in payment assignment rules interface 1200. Similar rules can be also be prepopulated for the most common (or all) merchant categories). User 902 can then rely on these prepopulated rules, modify them, or delete them and create their own.

Finally, some embodiments include a default rule 1228 that can be applied if no other rules are satisfied. As shown, default rule 1228 has no condition, and will accordingly be satisfied for any transactions that is not satisfied by any other rule, thus allowing the user to assign transaction that do not otherwise match a rule. In some embodiments, a user can also select from a variety of preconfigured default or non-default rules to ease the configuration process. One of skill in the art will appreciate that a variety of methods of configuring payment assignment rules equivalent to the above-described interface exist, and are contemplated as being within the scope of the invention.

In some embodiments, payment assignment rules interface 1200 may include additional features such as spillover budgeting. In such embodiments, if a transaction is allocated to a budget account with a remaining balance less than the assigned amount, a "spillover" budget account can be designated to cover any shortage. Once this spillover account is exhausted, further transactions exceeding budget account will be rejected as usual. Another feature in the budgeting account interface in some embodiments is an "explicit reject" action for rules. Using this action, transactions satisfying the condition for a rule can be rejected even if funds remain in the appropriate virtual budgeting account. For example, a user may specify that any transaction over $200 with a merchant category of "entertainment" is to be rejected, or that any transaction from a particular merchant is to be rejected. One of skill in the art will appreciate that a variety of methods of configuring payment assignment rules equivalent to the above-described interface exist, and are contemplated as being within the scope of the invention.

E. Account List

Returning now to FIG. 6, account interface 600 further includes list of budgeting accounts 614. List 612 determines which accounts budgeting account interface 600 makes available to the user to allocate transactions. Each budgeting account includes a name 614 and a monthly limit 616. In some embodiments, the user can use list 612 to specify additional information about budgeting accounts, such as a spillover account for a particular budgeting account, or when the budgeting month resets. The user can further add additional budgeting accounts using add account button 618. It will be immediately apparent to one of skill in the art that the functionality of interface 600 can be provided to the user in many different ways, and any interface or interfaces for allowing the user to add funding accounts and budgeting accounts is contemplated as being within the scope of the invention.

F. Exemplary Budgeting Scenario

To more clearly illustrate the operation of embodiments of the invention an exemplary scenario is provided. A taxpayer opts to receive their $500 income tax refund in the form of a prepaid card in accordance with embodiments of the invention. The user 902 then receives in the mail a payment vehicle 904 in the form of a magnetic stripe card, together with instructions for configuring virtual budgeting accounts and payment assignment rules. User 902 then logs on to the online banking site for the issuer of the card, financial institution 912, and is presented with budgeting interface 1100, which has been prepopulated with virtual budgeting accounts for groceries, gasoline, entertainment, restaurants, and general expenses. Because user 902 is a travelling salesman with a $1000 monthly expense account for expenses incurred when on the road, they use add account button 1128 to add an additional virtual budgeting account designated "travel expenses." The user then uses button 1110 to allocate the $500 tax refund to the budget account for entertainment, button 1108 to configure a recurring deposit of $2000 from the user's bank account corresponding to the user's direct-deposited paycheck, and button 1112 to allocate the recurring deposit among the user's budget accounts.

The user then selects payment rules button 1116 to configure the payment assignment rules. Again, default rules have been provided to assign transactions from merchants in a given category to the corresponding virtual budgeting account, so user 902 selects button 1226 to add a rule assigning payments to the travel expenses account. The user selects criterion 1204 to be "purchase location state", relation 1206 to be "not equal," and enters "Kansas" for value 1208. The user then enters "100" for amount in box 1212, selects "%" in dropdown 1214, and selects "travel expenses" from dropdown 1216, thereby allocating the entirety of any out-of-state purchase to the virtual budgeting account for travel expenses. Finally, user 902 adjusts the newly added rule using buttons 1224 such that it is applied before any other rule.

User 902 then makes a first purchase of groceries at a Wal-Mart. Because the merchant category for Wal-Mart is "groceries," and a default rule exists for assigning such purchases to the virtual budgeting account for groceries, the payment for this transaction is deducted from user 902's groceries budget. Some days later, user 902 makes a second purchase at Wal-Mart, this time of a new television. Knowing that purchases at Wal-Mart would ordinarily be deducted from the groceries budget, user 902 overrides the automatically determined virtual budgeting account at the merchant point-of-sale, instead specifying that this purchase is to be deducted from the "entertainment" virtual budgeting account.

After several months of successfully using the system, user 902 makes a large purchase from an out-of-state online merchant, which is (unintentionally and unknowingly) applied to the budget account for travel expenses, thereby exhausting it. When the user next uses payment vehicle 904 to pay for an out-of-state hotel, the payment is initially rejected since it is applied to the budget account for travel expenses, which does not have sufficient funds remaining, even though the balance on the prepaid card is sufficient to fund the transaction. The user instructs the hotel clerk to run the card again, thereby providing a budget override, and the transaction is approved.

Upon returning home, user 902 logs on to the online banking site for financial institution 912, and discovers the incorrectly assigned transaction. Using button 1114, user 902 changes the budget account for the online transaction from "travel expenses" to "entertainment," thereby restoring the balance of the budget account for travel expenses, and assigns the overridden hotel transaction to the budget account for travel expenses. As a result of reassigning the transaction, user 902 is prompted to edit the payment assignment rules using payment assignment rules interface 1200. In interface 1200, user 902 selects the rule for travel expenses and changes the condition to the compound condition "If (purchase location state) (not equal) (Kansas) AND (merchant category) (equal) (lodging)," thereby preventing further charges from being misapplied to the selected virtual budgeting account. The above scenario is provided purely for illustrative purposes to provide an example of the interoperation of the components previously described, and should not be taken as limiting in any way the scope of the invention described herein.

V. Personalized Rewards Program

Another feature offered by some embodiments of the present invention is reserved funds accounts that allow the user to segregate funds towards a particular goal. Unlike conventional demand-deposit accounts that require a user to open a new account with a financial institution, reserved funds accounts can be easily created by the user as subaccounts of an existing financial accounts. Funds can then be allocated to these reserved funds accounts without the cost or regulatory overhead of transfers between different financial accounts. For example, the user may create a reserved funds account dedicated to funding a planned vacation. In some embodiments, the user may allocate a portion of a recurring or one-time deposit to a reserved funds account as they would to a virtual budgeting account. In other embodiments, the user may specify that funds remaining in one, some, or all virtual budgeting accounts at the end of each budgeting cycle are transferred to one or more reserved funds accounts. In some embodiments, the user may additionally designate that funds from reward programs are to be automatically allocated to a reserved funds account. In still other embodiments, users may allocate funds to a reserved funds account using all of these (as well as other) methods. In some embodiments, when creating the reserved funds account, the user may specify a target savings amount and a target redemption date. In other embodiments, the user may also specify the objective that is being saved for. For example, the user could create a reserved funds account with the objective of saving $500 towards a new television by Christmas. In such embodiments, embodiments of the invention can help the user track whether they are on track to meet their goal.

In some embodiments, the availability of the funds in these reserved funds accounts may be restricted. For example, the funds allocated to a reserved funds account may not be available to fund general purchases until and unless the target savings amount and or due date have been reached. In some embodiments, these funds may be made available if the user provides a budgeting override. In other embodiments, the user must explicitly transfer funds out of the reserved funds account in order to access them for other purchases. In some embodiments, once the target savings amount is reached, the reserved funds account may only be redeemed for transactions with a merchant category corresponding to the objective. For example, in such embodiments, the funds in the reserved funds account for the television above could not be redeemed for a purchase of groceries, but rather only for the objective specified during the creation of the reserved funds account.

Furthermore, these reserved funds accounts can themselves be the basis of rewards programs. For example, if a user sets up a reserved funds account, and contributes at least a minimum amount to it each rewards period for a predetermined period, the financial institution may match the minimum periodic contribution. Similarly, the seller of a product or service being saved towards may sponsor a rewards program. Rewards programs can take any form now known or later developed, including cash rewards, airline miles, discounts on products or services, merchant points, and other forms as described herein. Rewards programs can further be instant, awarded periodically (e.g., at the end of each billing period), or awarded in a lump sum. For example, if a user creates a reserved funds account dedicated to a Walt Disney World vacation, Disney could contribute a percentage of the funds saved as rewards applicable to the planned vacation. Alternatively or in addition, rewards programs could be offered that are related to, but not implicit in the objective of the reserved funds account. For example, in response to a user creating the reserved funds account above, the user could be offered an airline miles reward program while contributing to the reserved funds account. In some embodiments, rewards could be awarded to the user for opening the reserved funds account.

In some embodiments, rewards can be awarded on the basis of successfully redeeming a reserved funds account. In the example above, if the user successfully allocates $500 towards the reserved funds account by Christmas, and redeems the reserved funds account accordingly, additional rewards may be awarded. In some such embodiments, the rewards may be credited to the payment vehicle generally; for example, if the payment vehicle is a prepaid card, cash rewards can be loaded back onto the prepaid card to fund general purchases. In other such embodiments, the reward may be allocated to a specific virtual budgeting account associated with the purchase category (e.g., to an "entertainment" virtual budgeting account for the television purchase). In still other embodiments, the rewards may take non-monetary form. For example, in the example above of a user saving for a Disney vacation, upon successful redemption of the reserved funds account, the user might be awarded a block of airline miles, which in turn could be redeemed for the flight to Walt Disney World. In yet other embodiments, the rewards could be in other forms unconnected with the payment vehicle, such as a mailed paper check.

In other embodiments, rewards programs may be targeted to the user on the basis of the reserved funds accounts they have created, with no other connection to the user's reserved funds accounts or funding accounts. For example, the user could be offered a buy-one-get-one-free promotion on admission to Walt Disney World in response to opening a reserved funds account for a Disney vacation. Alternatively or in addition, rewards programs could be offered to the user as they approach their savings goal or target date. For example, the promotion could be offered to the user when they reach 90% of their target savings amount or when they are one month away from the due date for the reserved funds account. Of course, multiple such rewards programs could be offered to the user for a reserved funds account, or on the basis of multiple such reserved funds accounts. The rewards programs offered may be determined on the category assigned to the reserved funds account by the user, information supplied by the user when creating the reserved funds account, the due date for the reserved funds account, a name assigned to the reserved funds account by the user, any other information, or a combination of multiple such sources of information.

A. Method of Assigning Personalized Rewards Programs

Turning now to FIG. 13, a flowchart 1300 illustrating the operation of a method in accordance with certain embodiments of the invention is depicted. The method begins at a step 1302 when a user visits the interface for creating a new reserved funds account. In some embodiments, this interface is integrated into budgeting interface 1100. In other embodiments, a dedicated reserved funds account interface is used for creating the reserved funds accounts. Where virtual budget accounts will typically have monthly allocations replenishing them due to regular withdrawals, reserved funds accounts may or may not have periodic allocations. In some embodiments, a user may instead or in addition specify that any balance left in a budgeting account is to be transferred to the reserved funds account as described above. In some embodiments, the user may in addition specify that cash rewards from other rewards programs are to be deposited into a designated reserved funds account. Additional details regarding the interface for creating reserved funds account can be found below.

Next, at step 1304, when creating a reserved funds account the user specifies information for the reserved funds account including a name, a category, a target savings amount, and a due date. In some embodiments, the user can choose any name for the account that is meaningful to them. In some embodiments, the categories available to select from are the same as the merchant categories described above. In other embodiments, the categories can instead correspond to one of the user's virtual budgeting accounts. In some embodiments, the user can also specify additional information as a part of creating the virtual funds account. For example, a user, when creating a reserved funds account named "vacation fund" in the category of travel, might be prompted to provide additional details, such as the destination, activities planned, and number of people travelling, in order to help plan the trip. Similarly, if a user creates a reserved funds account titles "new car" with a category of automotive, they might be prompted to specify whether they are purchasing a new or used car, the make and model of the desired car, and so on. In some embodiments, some or all of the information to be supplied by the user when creating the reserved funds account is optional and can be omitted.

Processing then proceeds to step 1306, where applicable rewards programs are determined based on the information provided by the user. Rewards programs might be sponsored by a financial institution backing a funding account (which might or might not require that the user use that particular funding account for transactions in order to receive the reward), by a merchant (who might or might not require that the user make purchases at that particular merchant in order to receive the reward), or even by a third party such as the government. The criteria for offering a rewards program can vary depending on the user, the reserved funds account and the sponsor. For example, as discussed above, Disney might wish to sponsor an airline miles rewards programs for users planning a Disney vacation, in order to encourage them to follow through on their plans by making cheaper plane tickets available. Conversely, if the user has a reserved funds account dedicated to a vacation, but has not specified a destination, Disney might offer a different rewards program, such as cash rewards for tickets to Disney parks and purchases made there, in order to steer the user's choice of vacation destination. Similarly, a user who has created a reserved funds account for an automobile might be offered rewards programs sponsored by local dealerships and/or automakers in order to steer their purchasing decision. As described above, cash rewards can be credited to the user differently for different rewards programs. In some embodiments, cash rewards might be instantly credited to the account balance of the payment vehicle. In other embodiments, rewards can be accrued monthly and credited to a particular reserved funds account. Other methods and frequencies of awarding cash rewards to the user are also contemplated as being within the scope of the invention.

Next, at a step 1308, the user is presented with the option to enroll in the rewards programs determined to be applicable at step 1306. In some embodiments, the user is presented with these options immediately upon creating the reserved funds account. In other embodiments, certain rewards programs may be offered based on the reserved funds account approaching its due date. For example, if a user creates a reserved funds account for a vacation with a due date one year in the future, it may not be desirable to immediately present the user with a rewards program offering discounted airline tickets. Rather, presenting the user with the rewards program a month or two before the intended date of the vacation may result in better user acceptance and use of the offer. Similarly, it may be desirable to delay some offers until the user redeems the reserved funds account. In the example above of a user creating a reserved funds account for purchasing a vehicle, a rewards program offering rewards for routine car maintenance might better be offered when the user redeems the reserved funds account to make the purchase. In addition, if a sponsor makes a new offer available, it may be offered to users who have currently existing reserved funds accounts matching the requirements. In some embodiments, offers may also be presented to the user based on the reserved funds account approaching or reaching its target savings amount. Multiple offers may be determined to be applicable to a given user creating a reserved funds account, and offers may be presented to the user at different times, each according to its own criteria.

VI. Unified System

Some embodiments of the invention may include a combination of some or all of the above-discussed features, providing even greater benefit than the sum of the individual features alone. Turning now to FIG. 14, a high-level flowchart showing the flow of a transaction according to yet another embodiment of the present invention is depicted and generally referred to by reference numeral 1400. Initially, at step 1402, the transaction information (including, e.g., the merchant with whom the transaction is being conducted) is received. As discussed above, this determination may be performed in a number of ways, and can be performed on the payment vehicle itself or elsewhere in the payment-processing network.

Once the transaction information has been received, the relevant discounts and other reward programs can be identified and the total payment due calculated at step 1404. As discussed above, the relevant rewards programs, coupons, loyalty programs, punch cards, and other ways of reducing the total payment due may be determined based on the available funding vehicles, the merchant, personalized rewards programs offered to the user on the basis of their anticipated spending, the individual items being purchased, or other factors. These relevant rewards programs, coupons, frequent shopper program cards, punch cards, and other means of reducing the total payment due are then presented to the merchant point-of-sale. As discussed above, in some embodiments this may be accomplished in a single exchange between the payment vehicle and the merchant point-of-sale. In other embodiments, each coupon, punch card, etc. must be presented separately. At this point, the final payment amount due can be calculated, and is presented by the merchant point of sale to the user. In some embodiments, the payment amount is presented to the payment vehicle. In other embodiments, it is presented, along with identification information from the payment vehicle, to a financial institution or payment clearinghouse in the payment-processing network.

When the payment amount for the transaction has been received, processing can proceed to step 1406, where the budgeting account selector (which can, as discussed above, be located at a variety of locations in the payment-processing network) can assess the payment across the user's virtual budgeting account and determine whether the transaction conforms to the user's budget. If so, processing can proceed to step 1408. Otherwise, as discussed above with respect to FIG. 10, a budgeting rejection can be sent for potential override by the user.

Finally, at step 1408, the funding account selector (which can also be located at a variety of locations throughout the payment-processing network, and need not be co-located with the budgeting account selector) allocates the payment across the user's funding accounts according to the rules the user has configured, as discussed above with respect to FIG. 4. If the aggregate credit limit on the user's funding accounts is more than the payment amount, then the transaction is approved and processing completes. Otherwise, the transaction is rejected. In some embodiments, when a transaction is rejection, the prior processing with respect to loyalty programs and budgeting accounts must be backed out before processing can complete.

As an example of how this integrated system works, consider a customer shopping for groceries. As the user walks into the grocery store, the payment vehicle (here, a mobile payment app loaded on their smartphone) uses geolocation to determine that the user is at the grocery store, and alerts them that they have a coupon redeemable for Cheerios and that they have completed a buy-six-get-one-free punch card for pies. The user is furthermore informed that, by using the funding account to pay for the purchase that the user's rules (as stored on the local rules data store) specify, cash rewards totaling 1.5% of the purchase amount will be earned. In other embodiments, the system may automatically determine and apply all relevant discounts without alerting the user. Once the user has made their selections from the store and proceeded to the checkout, the smartphone interfaces with the merchant's point-of-sale to determine which items are eligible for a promotion such as a coupon or punch-card punch. The mobile payment app then provides the user's frequent shopper card (in order to access certain sales that are only available to frequent shoppers), redeems the punch card for a free pie, and provides the coupon for the Cheerios. Once all the discounts have been applied, the mobile payment app receives the total payment amount due for the transaction, and (after consulting the locally stored budgeting rules data store) verifies that the user has sufficient funds remaining in the "groceries" virtual budgeting account. Once this is verified, the mobile payment app provides the merchant's point-of-sale with the account details for the financial account selected by the rules. Once the payment clearing house and/or issuing financial institution have approved the payment, the transaction is completed. At the end of the rewards period, the applicable cash rewards are deposited, as the user has configured, in a reserved funds account previously set up by the user to save up for a vacation. Although the above example includes a combination of a number of features of the invention, Combinations with fewer features are also contemplated. For example, a unified payment vehicle with customized rewards programs could be present without budgeting in one embodiment.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media having computer-executable instructions stored thereon which, when executed by a processor, provide an interface engine operable to:
   provide, to a user, a funding account graphical user interface allowing the user to input a plurality of funding accounts and associated information, wherein the associated information includes an account type, an account number, and at least one of: a limitation on the use of the funding account and details of at least one rewards program associated with the funding account;
   provide, to the user, a rewards program graphical user interface allowing the user to supply rewards program information including the details for the at least one rewards program;
   provide, to the user, a rules graphical user interface allowing the user to input a plurality of rules specifying how a payment is to be allocated among the plurality of funding accounts based on the associated information; and
   provide, to the user, a category graphical user interface allowing the user to select a transaction category at the time of payment, wherein at least one rule is based at least in part on the transaction category;
   wherein the interface engine is incorporated into a payment vehicle,
   receive transaction information by the payment vehicle from a merchant, wherein the transaction information is indicative of a plurality of products; and
   generate a transaction for payment for each product of the plurality of products,
   wherein the plurality of rules for allocating the payment among the plurality of funding accounts is automatically implemented by the processor so as to perform one of a minimization, a maximization, and a satisfaction of a target specified by the user.

2. The non-transitory computer-readable media of claim 1, wherein:
   the interface engine is further operable to provide, to the user, a budgeting account graphical user interface allowing the user to input a plurality of budgeting accounts; and
   wherein at least one rule further specifies how the payment is allocated among the plurality of budgeting accounts.

3. The non-transitory computer-readable media of claim 1,
   wherein the rules graphical user interface further includes a criterion for each rule of the plurality of rules,
   wherein the rules graphical user interface further includes a relation between the criterion and a value, and
   wherein the value must be satisfied by the criterion before each of the plurality of rules is implemented.

4. The non-transitory computer-readable media of claim 1, wherein at least one rule is based at least in part on a merchant category associated with the payment.

5. The non-transitory computer-readable media of claim 1, wherein at least one rule is based at least in part on information to be supplied by the user at the time the payment is made.

6. The non-transitory computer-readable media of claim 1, wherein at least one rule is based at least in part on the at least one rewards program.

7. The non-transitory computer-readable media of claim 1, wherein the at least one rewards program includes one or more cash rewards programs, and wherein at least one rule for allocating the payment among the plurality of funding accounts is automatically determined so as to perform a maximization of the one or more cash rewards programs.

8. The non-transitory computer-readable media of claim 1, wherein the at least one rewards program includes one or more airline miles rewards programs, and wherein at least one rule for allocating the payment among the plurality of funding accounts is automatically determined so as to perform a maximization of the one or more airline miles rewards programs.

9. The non-transitory computer-readable media of claim 1, wherein at least one rule for allocating the payment among the plurality of funding accounts is automatically determined so as to perform a minimization of interest rates.

10. The non-transitory computer-readable media of claim 1, wherein at least one rule for allocating the payment among the plurality of funding accounts is automatically determined so as to perform a minimization of fees incurred by the user.

11. The non-transitory computer-readable media of claim 1, wherein at least one rule for allocating the payment among the plurality of funding accounts is automatically determined so as to perform a satisfaction of a card requirement.

12. The non-transitory computer-readable media of claim 1, wherein the interface engine is further operable to:
   receive an image of an indicia associated with an item to be purchased; and
   determine, from the indicia, item rewards associated with the item;
   apply the item rewards to associated funding accounts; and
   allocate the payment based on the associated funding accounts and the item rewards.

13. The non-transitory computer-readable media of claim 1, wherein the category graphical user interface allows the user to select the transaction category from a pre-populated list of transaction categories.

14. The non-transitory computer-readable media of claim 1, wherein the category graphical user interface allows the user to input a custom transaction category.

15. The non-transitory computer-readable media of claim 4, wherein the merchant category is different from the transaction category.

16. The non-transitory computer-readable media of claim 1, wherein the category graphical interface allows the user to override an automatically supplied transaction category.

* * * * *